(12) United States Patent
Ferber et al.

(10) Patent No.: US 7,720,575 B2
(45) Date of Patent: May 18, 2010

(54) PIPELINE FLOW CONTROL OPTIMIZATION SOFTWARE METHODS

(75) Inventors: E. Philip Ferber, Bridgeport, WV (US); B. Kenneth Fouts, Bridgeport, WV (US); Patrick H. Fox, Jr., Weston, WV (US); Brian A. Haught, Mount Clare, WV (US); Evan Heatherly, Belington, WV (US); Dale Rusnak, Grafton, WV (US); Bernard L. See, Clarksburg, WV (US)

(73) Assignee: Dominion Transmission, Inc., Clarksburg, WV (US)

( * ) Notice: Subject to any disclaimer, the term of this patent is extended or adjusted under 35 U.S.C. 154(b) by 0 days.

(21) Appl. No.: 11/171,205

(22) Filed: Jul. 1, 2005

(65) Prior Publication Data
US 2006/0009881 A1    Jan. 12, 2006

Related U.S. Application Data

(60) Provisional application No. 60/584,676, filed on Jul. 2, 2004.

(51) Int. Cl.
*G05D 11/00* (2006.01)
(52) U.S. Cl. .................... 700/282; 700/281; 700/301
(58) Field of Classification Search ................ 700/282, 700/281, 301
See application file for complete search history.

(56) References Cited

U.S. PATENT DOCUMENTS

| | | | |
|---|---|---|---|
| 3,776,249 A | 12/1973 | Wailes et al. | |
| 4,200,911 A | 4/1980 | Matsumoto | |
| 4,526,513 A | 7/1985 | Bogel | |
| 4,584,654 A | 4/1986 | Crane | |
| 4,835,687 A * | 5/1989 | Martin | 705/7 |
| 5,509,434 A | 4/1996 | Boyd et al. | |
| 5,550,761 A | 8/1996 | Pauchon et al. | |
| 5,565,862 A | 10/1996 | Hubbard et al. | |
| 5,960,187 A | 9/1999 | Faille et al. | |
| 6,112,137 A | 8/2000 | McCarty et al. | |
| 6,178,393 B1 * | 1/2001 | Irvin | 703/10 |
| 6,236,894 B1 | 5/2001 | Stoisits et al. | |
| 6,697,713 B2 | 2/2004 | Megan et al. | |
| 6,701,223 B1 * | 3/2004 | Rachford et al. | 700/301 |

OTHER PUBLICATIONS

Phil Ferber, "Gas Pipeline Optimization", 1999, [http://psig.org/papers/1990/9905.pdf], Pag. 1-16.*
Written Opinion of the International Searching Authority for PCT/US05/23604.

(Continued)

*Primary Examiner*—Paul L Rodriguez
*Assistant Examiner*—Nathan Laughlin
(74) *Attorney, Agent, or Firm*—McGuire Woods LLP

(57) ABSTRACT

Pipeline flow optimization systems, software, and methods that emulate transient optimization are disclosed. A pipeline flow optimization system includes an upset condition handler that is adapted to provide a multivariable controller with pipeline flow adjustments to handle one or more upset conditions. The optimization system may be used with fluid pipeline systems, including gas pipeline systems and liquid pipeline systems. Systems, software, and methods according to embodiments of the invention may further include linepack transition handling capabilities and administrative tools.

33 Claims, 37 Drawing Sheets

OTHER PUBLICATIONS

Henry. H. Rachford, Jr. and Richard G. Carter, Stoner Associates, Inc., "Optimizing Pipeline Control in Transient Gas Flow", pp. 1-25.

Richard Cater, Henry Rachford, and Todd F. Dupont, "Gas Transient Optimization-A work in progress", Advantica Inc., 2007, 27 pages.

Richard G. Carter, Henry H. Rachford, Jr., Advantica, Inc., Houston, Texas; and Todd F. Dupont, University of Chicago, Chicago, Illinois, "Developing a New Approach to Gas Control", Pipeland and Gas Technology, http://www.pipelineandgastechnology.com/story.phy?storyfile=90d7d8ad-3d63-4cfc-b4ac-.., pp. 1-8, Jul. 12, 2007.

* cited by examiner

PIPELINE FLOW CONTROL OPTIMIZATION SOFTWARE METHODS

CROSS REFERENCE TO RELATED APPLICATION

This application claims the benefit of U.S. Provisional Patent Application No. 60/584,676, filed on Jul. 2, 2004, which is hereby incorporated by reference for all purposes as if fully set forth herein.

BACKGROUND OF THE INVENTION

1. Field of the Invention

The invention relates to software and methods for fluid pipeline optimization and control, and more specifically, to optimization and control software and methods that can optimize for transient conditions within the fluid pipeline.

2. Description of Related Art

Fluid pipeline systems, such as gas transmission pipelines, operate at certain pressures and with certain flow rates in order to deliver fluid, for example, natural gas, to its destination. In the case of a gas pipeline, compressors along the pipeline maintain the pressures necessary to move the gas. In the case of a liquid pipeline, pumps move the liquid along the pipeline.

FIG. 1 is a diagram showing a typical gas pipeline system. Generally, referring to FIG. 1, a typical gas pipeline system may include multiple relay compressor stations with multiple points of supply and deliveries. For example, FIG. 1 shows a pipeline system having 6 compressor stations. Each individual station is controlled by control logic that, among other things, operates compressors and prevents a station from exceeding its maximum allowable operating pressures. The pipeline operator, through a supervisory control and data acquisition (SCADA) system, gives each individual compressor station's control logic its own target setpoints for suction pressure, discharge pressure and flow. The station's control logic seeks to maintain these target setpoints by starting and stopping compressors, as necessary. Additionally, as noted above, the control logic protects the station from exceeding its maximum allowable operating pressures and maintains it within safe operating parameters. However, the station control logic controls an individual station. Hence, it functions independent of the other stations in the system.

FIG. 2 is a diagram showing a pipeline flow control system that may be utilized to control the pipeline system of FIG. 1. Generally, referring to FIG. 2, a pipeline flow control system may include steady-state Optimization Software that calculates optimal target setpoints for the pipeline operator to manually send to the individual stations' control logic. Further, as FIG. 2 shows, the system may also include a multivariable control system ("Controller Software") operating in conjunction with the optimization software. The multivariable controller software may include a set of controllers that attempts to drive a set of station discharge pressures to equal a set of discharge pressure targets calculated by the optimization software, and there may be one controller for each compressor station that is operating under multivariable control. Each controller attempts to manipulate the suction pressure of the compressor station it controls in order to drive the discharge pressure of the next upstream station toward its optimal discharge pressure target.

However, fluid pipelines are dynamic systems, and the control systems described with reference to FIG. 1 and FIG. 2 may not anticipate or take into account certain transient (i.e. non-steady state) conditions. Additionally, because each controller in the system of FIG. 2 typically controls its station in light of operating conditions at that station and the next upstream station only, the controller software is controlling individual stations on the pipeline, which are all interconnected, based on data gleaned from only a portion of the stations in the system. Hence, the controller software may not effectively control all stations on the pipeline system in light of transient conditions affecting the entire pipeline system or other portions of the pipeline system beyond the control of an individual controller. Accordingly, the controller software may, among other things, increase the cost of transporting fluid through the pipeline.

Further, the system shown in FIG. 2 utilizes a single set of tune parameters to handle all transient conditions but that are aimed at only controlling the setpoints of the immediate upstream compressor station. However, certain transient conditions may occur in the pipeline system that can not be efficiently or effectively managed by only controlling the setpoints of the immediate upstream compressor station. In such transient conditions, the controller software's single set of tune parameters does not provide the capability to adjust station operating parameters to effectively or timely handle the transient conditions. Hence, in this case, the stations' control logic over-rides the multivariable controller software and controls corresponding individual compressor station targets to near maximum operating pressures. Generally, this leads to an imbalance in the system, which usually results in not being able to take the full contracted supplies into the transmission system.

Additionally, the control system of FIG. 2 is not able to identify or transition to a new optimal solution when conditions change (e.g. supplies or deliveries of the transmission system) that require a change to the optimal compressor configuration. A particular problem encountered was when to start additional compressors when required for an optimal fuel-efficient system. Starting the additional compressors too early wastes fuel. On the other hand, starting the additional compressors too late may cause a transient condition that is beyond the capability of the controller software to control, resulting in station control logic overriding the controller software.

SUMMARY OF THE INVENTION

The present invention provides a pipeline flow optimization system that emulates transient optimization.

Additional features of the invention will be set forth in the description which follows, and in part will be apparent from the description, or may be learned by practice of the invention.

The present invention discloses a pipeline flow optimization system, comprising an upset condition handler adapted to provide a multivariable controller with pipeline flow adjustments to handle one or more upset conditions.

The present invention also discloses a pipeline flow optimization system including an upset condition handler, a multivariable controller for controlling components of a pipeline system, optimization software for calculating steady-state parameters of the pipeline system and providing the steady-state parameters to the upset condition handler, and a supervisory control and data acquisition system for acquiring pipeline system data. The upset condition handler receives the pipeline system data from the supervisory control and data acquisition system and provides the multivariable controller with pipeline flow adjustments to handle one or more upset conditions.

The present invention also disclose a pipeline flow control system including an optimizer for calculating steady-state parameters of a pipeline system, a controller for controlling pipeline system components that cause pipeline flow, a data acquirer for acquiring pipeline system component data and pipeline flow data, and a control logic unit. The control logic unit adjusts the steady-state parameters of the pipeline system in response to an upset condition by analyzing the pipeline system component data and the pipeline flow data and applying an adjustment factor to the controller.

The present invention also discloses a method of handling transient conditions in a pipeline flow optimization system. In the method, one or more adjustment factors are calculated. Each of the adjustment factors is indicative of a degree to which a correction is needed for an upset condition. The adjustment factors are stored, one or more of the adjustment factors are chosen and applied to the pipeline flow optimization system.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

DETAILED DESCRIPTION

As was described above, aspects of the invention relate to systems and methods for fluid pipeline flow optimization and, in particular, systems and methods for fluid pipeline flow optimization that are capable of handling transient or upset conditions. In their broadest embodiments, software and methods according to the invention ensure that the demand for a fluid flowing in a pipeline is met. That demand is typically subject to certain requirements, for example, that particular volumes of the fluid be delivered at pressures between specified minimum and maximum delivery pressures. Additionally, systems and methods according to the invention ensure that fluid pipeline transmission facilities are operating within the engineering design parameters for which they were designed. In general, those two requirements are met by regular monitoring and by controlling fluid pipeline parameters to keep them within acceptable tolerances (sometimes referred to as "deadbands"). Systems and methods according to embodiments of the invention may also provide human controllers with feedback as to the pipeline's present fuel efficiency, and may provide engineers with calibration tools necessary to tune software, systems, and methods according to the invention.

Software according to embodiments of the invention provides one or more of the following three modules or capabilities: upset condition algorithms and upset condition handling, linepack transition handling, and administrative tools. Upset condition algorithms recognize when conditions vary from the static optimization and change compressor setpoints along the gas pipeline to account for the upset while continuing to optimize fuel efficiency within the given compressor unit configuration. Linepack transition handling algorithms calculate the time required to attain optimal pressure targets when a future optimal run dictates a change in compressor unit configuration. Administrative tools comprise measurement methods used to determine fuel efficiency performance, and allow accurate cost savings reports to be generated. Administrative tools may also include calibration tools used to tune the models created by the software.

Although most aspects and embodiments of the invention are equally applicable to any type of fluid pipeline system, including gas pipelines and liquid pipelines, certain embodiments of the invention will be described with respect to gas transmission pipeline networks.

Figure 1:
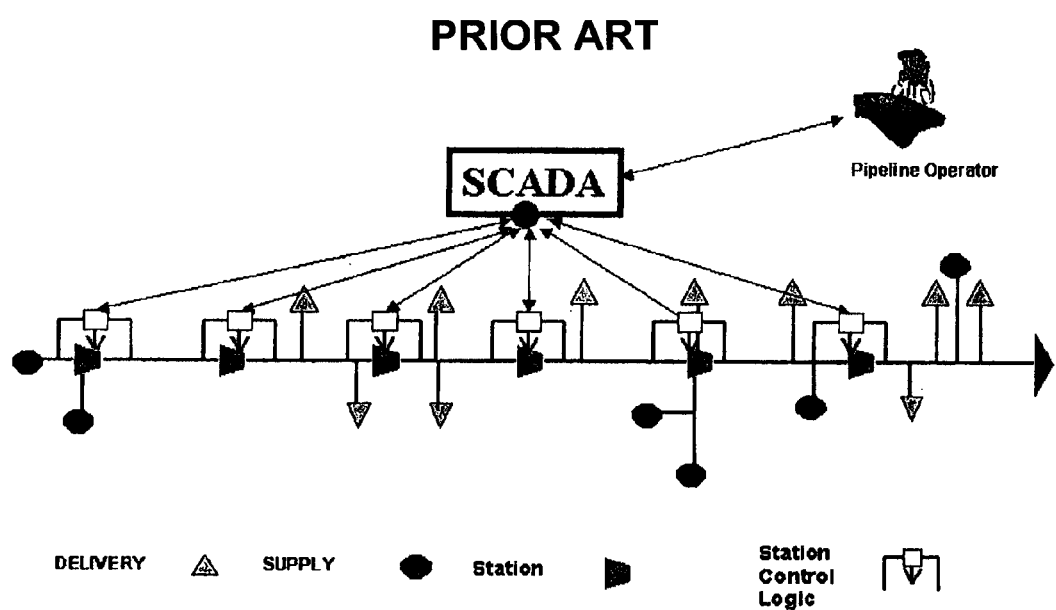
FIG. 1 is a diagram showing a typical gas pipeline system.
Figure 2:
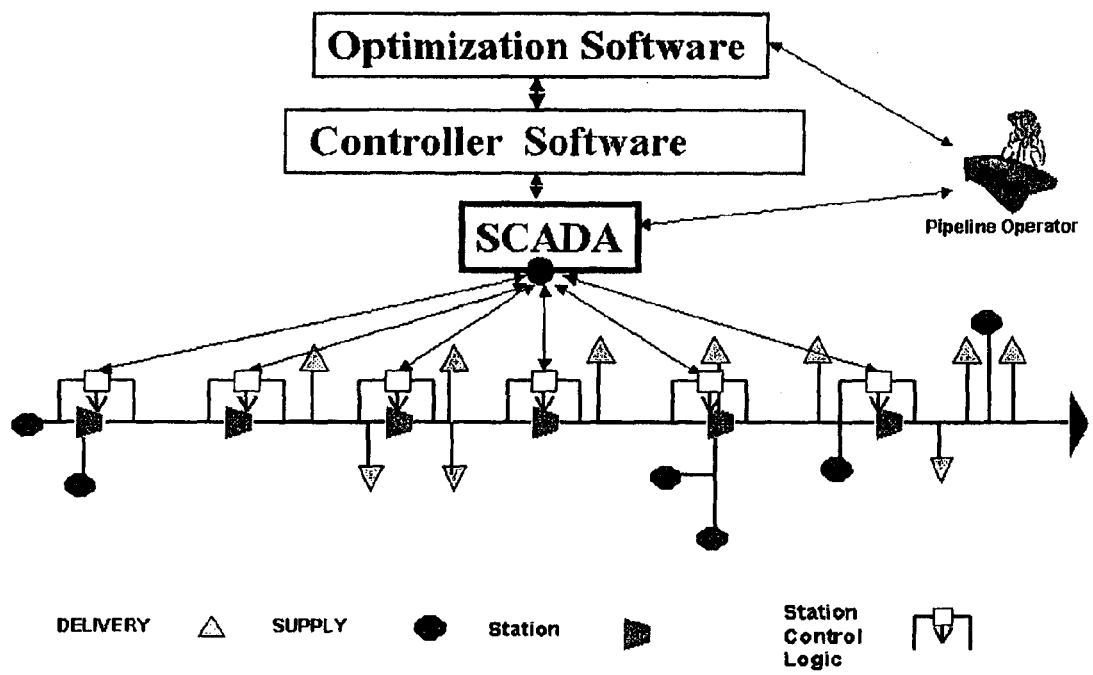
FIG. 2 is a diagram showing a pipeline flow control system that may be utilized to control the pipeline system of FIG. 1.
Figure 3:
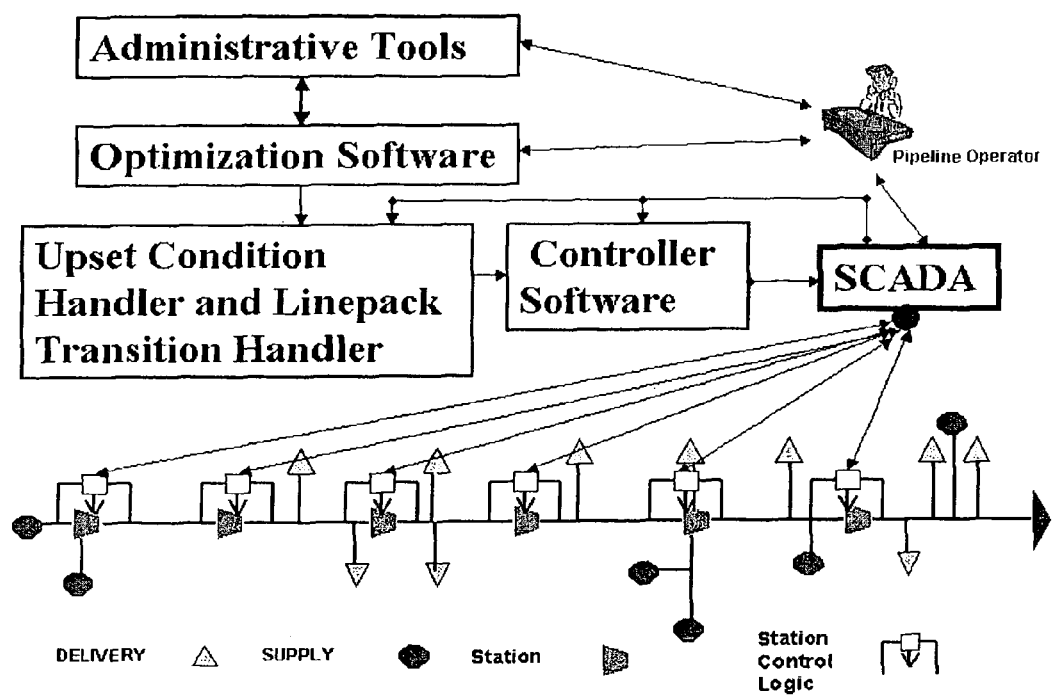
FIG. 3 is a diagram showing an automated pipeline optimization system according to an embodiment of the invention.

FIG. 3 shows an automated pipeline optimization (APO) system according to an embodiment of the invention. Referring to FIG. 3, systems and methods according to gas pipeline-based embodiments of the invention typically combine a multivariable control system ("Controller software") with optimization simulation programming ("Optimization Software") through a supervisory control and data acquisition (SCADA) system to reduce fuel consumption at compressor stations along the gas pipeline network. The APO system utilizes an upset condition handler and a linepack transition handler ("Black Box") to optimize pipeline operations by accounting for and handling-all upset conditions and linepack transitions. The upset condition handler handles transient conditions, including those that previously would have caused the stations' control logic to override the controller software. The APO system detects transient conditions occurring throughout the pipeline system, evaluates and selects a transient condition to address, and then chooses an optimal solution, from among multiple potential solutions, to address the selected condition.

Accordingly, utilizing the Administrative Tools, the Upset Condition Handler, and the Linepack Transition Handler in the pipeline flow optimization system of FIG. 3 provides a system that may maintain optimal steady-state configurations and properly adjust optimal steady-state pressure targets through upset conditions; that may identify through existing field compressor logic, or supply or delivery change of the predictive models, when a new compressor configuration may be required; that may quickly transition to the new optimal solution; that may verify results through a verification process of an Automated Calibration Tool; and that may quantify the results of the pipeline optimization process through a Fuel Attainment process.

In embodiments of the invention, the methods according to the invention may be incorporated into the multivariable control system, or they may be implemented separately, as shown in FIG. 3, in which case they would be used to generate inputs into the multivariable control system. Although any multivariable control system may be used, GE-CCI's MVC-4.0® multivariable control system is one suitable system. Further, although any optimization software may be used, Advantica's Stoner Gas Solver for EMM (Energy Minimization Module) is one suitable package. Whether alone or as part of a multivariable control system, systems, methods and software according to embodiments of the invention may be programmed and implemented in any one of a number of programming languages, including C, C++, C#, Java, Visual Basic, and any other programming language able to implement the tasks of the methods.

One embodiment of the invention was implemented for testing using a section of gas transmission line including approximately 220 miles of gas transmission piping with six compressor stations spaced 40-45 miles apart along the gas transmission line, and certain portions of the description that follows will refer to specific locations along that testbed gas transmission line. However, it should be understood that systems, methods, and software according to embodiments of the invention may be implemented in fluid pipeline systems of any size or complexity.

Figure 4:
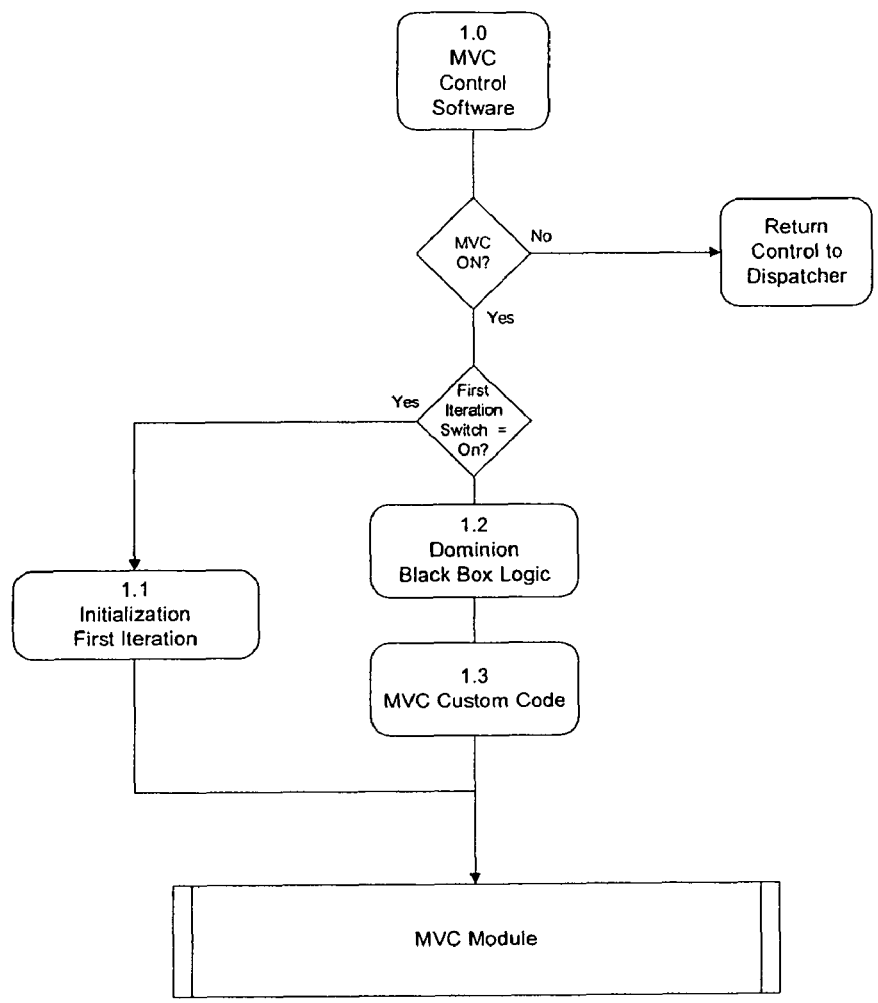
FIG. 4, FIG. 5, FIG. 15, FIG. 16, and FIG. 17 are schematic flow diagrams illustrating a pipeline flow management system in accordance with embodiments of the invention.
Figure 5:
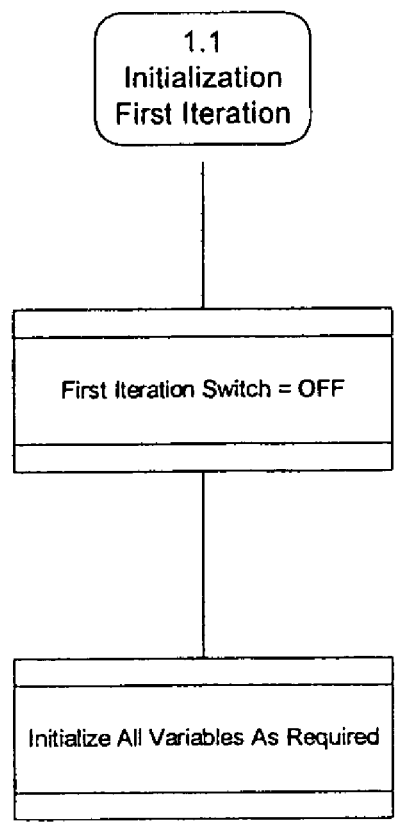

FIG. 4, FIG. 15, FIG. 16 and FIG. 17 are schematic flow diagrams showing the overall control logic used to select the mode of the system. Each time the system is turned on, the total available horsepower is summed, and other power-on and initialization tasks may be performed. (Several exemplary tasks are shown in FIG. 4). Once the initialization tasks are performed as per FIG. 4 and FIG. 5, the control logic (i.e. the upset condition handler and the controller software) monitors the operating mode of the system. During times when the system is operating normally, the system is kept in "normal" mode. In "normal" mode, the system can handle transient conditions and changes within certain tolerances.

If a severe problem should occur in the pipeline, such as the unexpected shutdown of a compressor that is needed to maintain system integrity, the control logic changes the mode of the system for that particular compressor to "event." In "event mode," the operator is notified and the control logic that would normally allow compressors to operate at or near 100% of their rated power without starting new compressors is deactivated so as to facilitate starting replacement compressors. In addition, appropriate pressure set points upstream of the station in "event" mode are reduced to "event" mode settings to minimize the probability that the upstream station will shut down because of over-pressure alarm conditions. The appropriate target pressures downstream from the station in "event" mode are reduced by the algorithms described above and below. The operator may also take additional actions to resolve the problem. When "event mode" is terminated, the system resets the settings to conform to "normal mode" settings. As compared with standard multivariable control systems, "event" mode in systems according to the present invention is typically invoked only selectively and only to the extent needed to maintain system integrity.

In both "normal" and "event" modes, the system uses a factor- or parameter-based method for dealing with upset or transient conditions. This method is generally illustrated in the schematic flow diagram of FIG. 6. The actual upset or transient conditions that the system detects and handles may vary from pipeline to pipeline, and are generally defined depending on the type of pipeline and the needs of the users. However, the parameter-based method will be described with respect to certain standard upset conditions for a gas pipeline.

Figure 6:
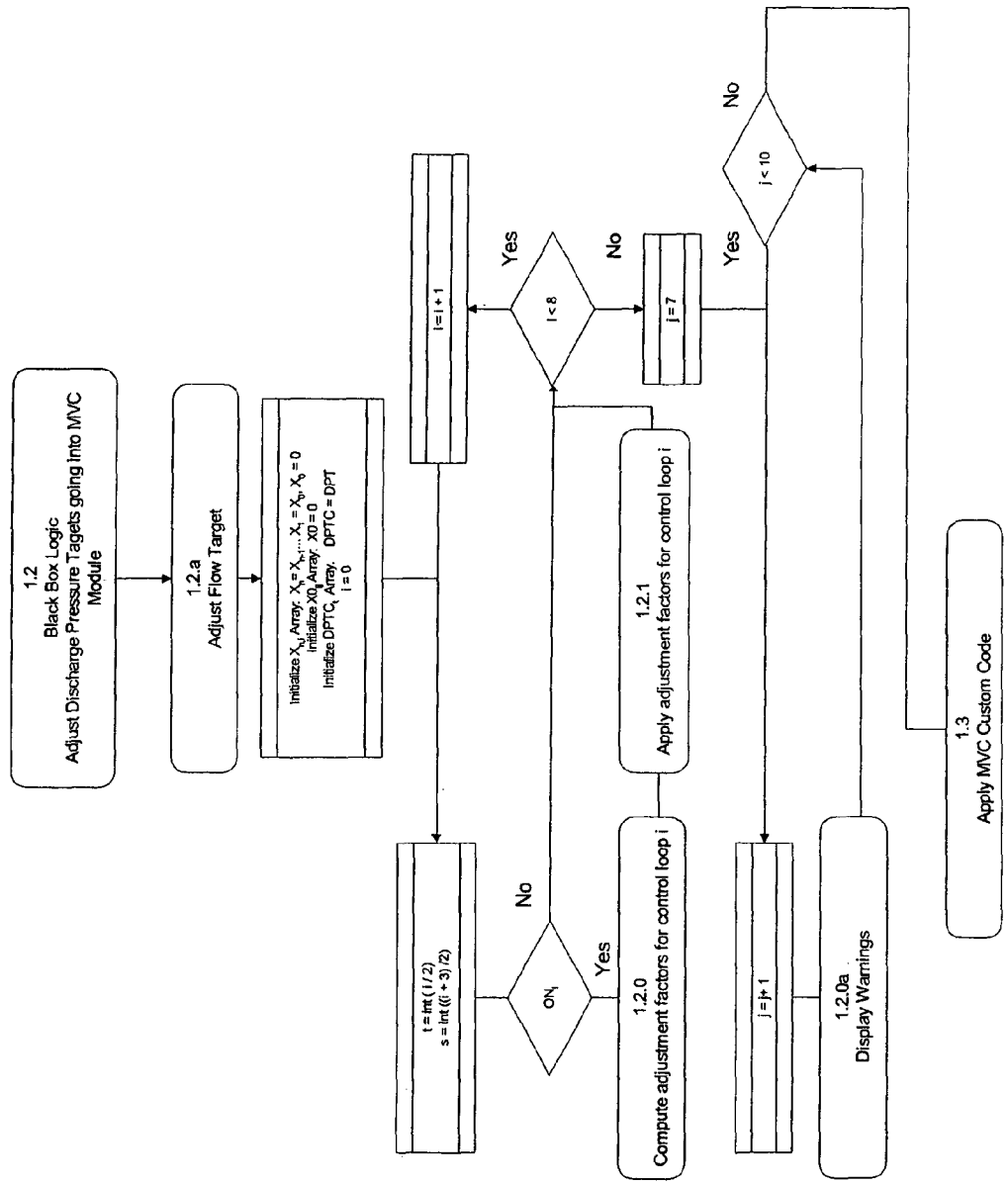
FIG. 6 and FIG. 7 are schematic flow diagrams illustrating the general process of computing and applying adjustment factors for a number of upset conditions.
Figure 7:
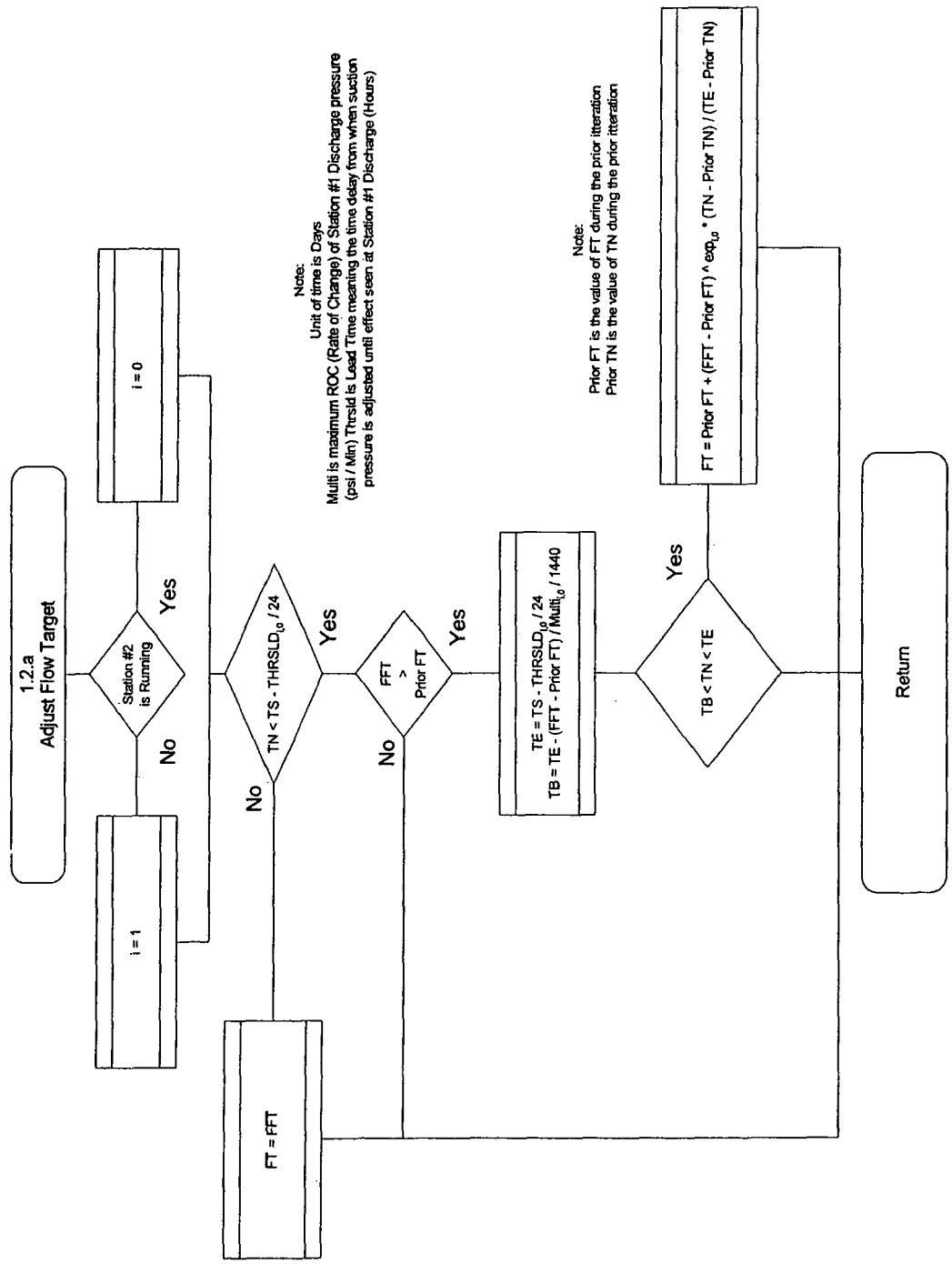

As shown in FIG. 6, in general, the system initializes an array or other data structure. In other words, the system clears out old data and inputs current data. Prior to initializing the array or data structure, the system determines whether to adjust a flow target, as shown in FIG. 6 and FIG. 7. Each data location within the array or other data structure contains a value for an adjustment factor indicative of the degree to which a correction is needed for a particular upset condition. The system engages in an iterative process of calculating the values of each of the adjustment factors and storing them in the array or other data structure. Once values for each adjustment factor have been calculated, the system selects and applies the most necessary of the adjustment factors. Typically, the most necessary of the adjustment factors would be the adjustment factors with the largest values in the array or other data structure, although this need not be the case.

For example, in FIG. 6, the array contains space for the values of ten adjustment factors, indexed 1-10, although as many adjustment factors as desired may be monitored by systems, methods, and software according to the invention. It should also be understood that the upset conditions and corresponding adjustment factors may include both adjustment factors for which the system can take automatic action to correct and adjustment factors for which the only action is to notify the human operator of the condition. This will be described below in more detail.

Figure 8:
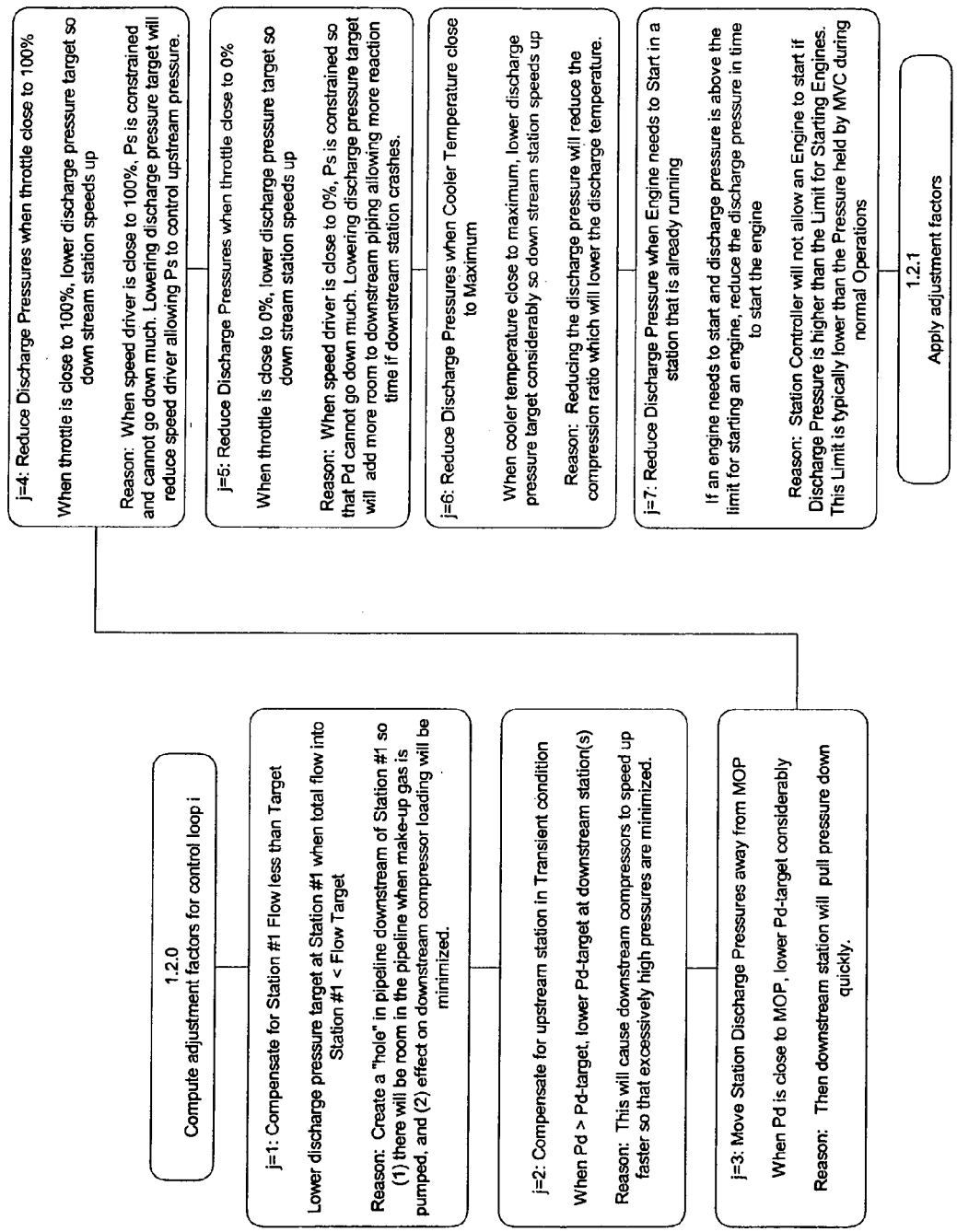
FIG. 8 and FIG. 12 are schematic flow diagrams illustrating the computation of adjustment factors for a number of upset conditions.
Figure 12:
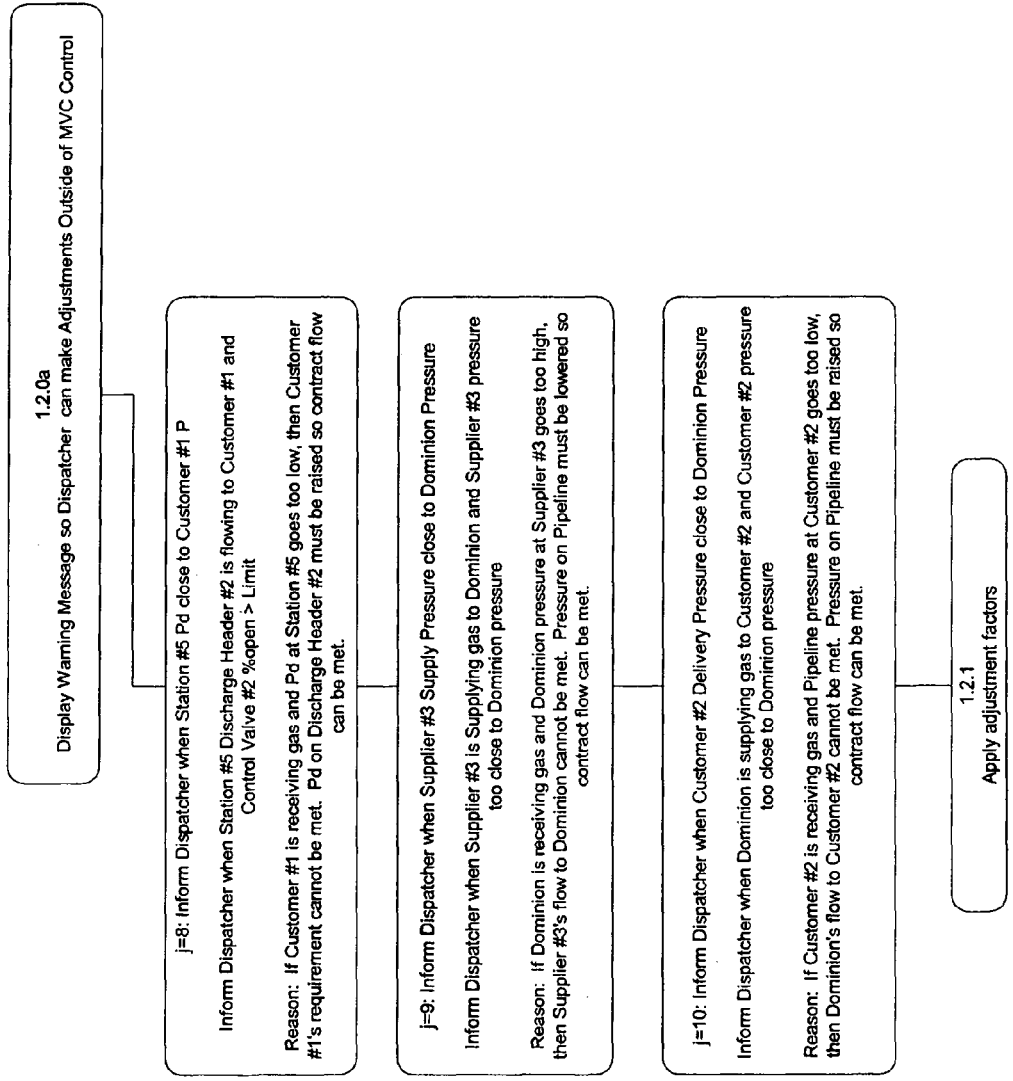

FIG. 8 and FIG. 12 are schematic flow diagrams illustrating the iterative calculation of each of the adjustment factors for the respective upset condition. As shown in FIG. 8, the first upset condition (j=1) is the condition in which the flow at the intake ("Station #1" in the figure) is less than the target flow rate. The second upset condition (j=2) is the condition in which an upstream compressor station is in a high-flow transient condition. The third upset condition (j=3) is the condition in which one or more of the compressor station discharge pressures is close to or at the maximum operating pressure ("MOP" in the figure). The fourth upset condition (j=4) is the upset condition in which the throttle or speed driver of one or more compressors is near 100%. The fifth upset condition (j=5) is the upset condition in which the throttle or power of one or more compressors is near 0%. The sixth upset condition (j=6) is the upset condition in which the cooler temperature is close to maximum. The seventh upset condition (j=7) is the upset condition in which an engine needs to start in a station that is already running. Referring to FIG. 12, the eighth upset condition (j=8) is the upset condition in which a discharge pressure at a particular location ("Station #5" in the figure) is close to a delivery pressure required by a customer ("Customer #1" in the figure). The ninth upset condition (j=9) is the upset condition in which the supply pressure at a particular point in the pipeline ("Supplier #3" in the figure) is close to the pressure in the pipeline. The tenth upset condition (j=10) is the upset condition in which the delivery pressure at a particular point in the pipeline ("Customer #2 delivery pressure" in the figure) is close to the pressure in the pipeline. The eighth, ninth, and tenth upset conditions are conditions that the multivariable control system may not be able to directly address, so action on those three upset conditions is limited to notifying the human operator. However, as was noted above, the array of adjustment factors for upset conditions may include any number of factors and may include both factors for upset conditions that can be handled automatically and factors that require operator notification in any combination. In some embodiments, only factors that can be handled automatically may be included in the array or other data structure. As shown in FIG. 6, FIG. 8 and FIG. 12, once adjustment factors are calculated for each of the ten upset conditions defined in this embodiment of the invention, the appropriate adjustment factors are chosen and applied.

Figure 9:
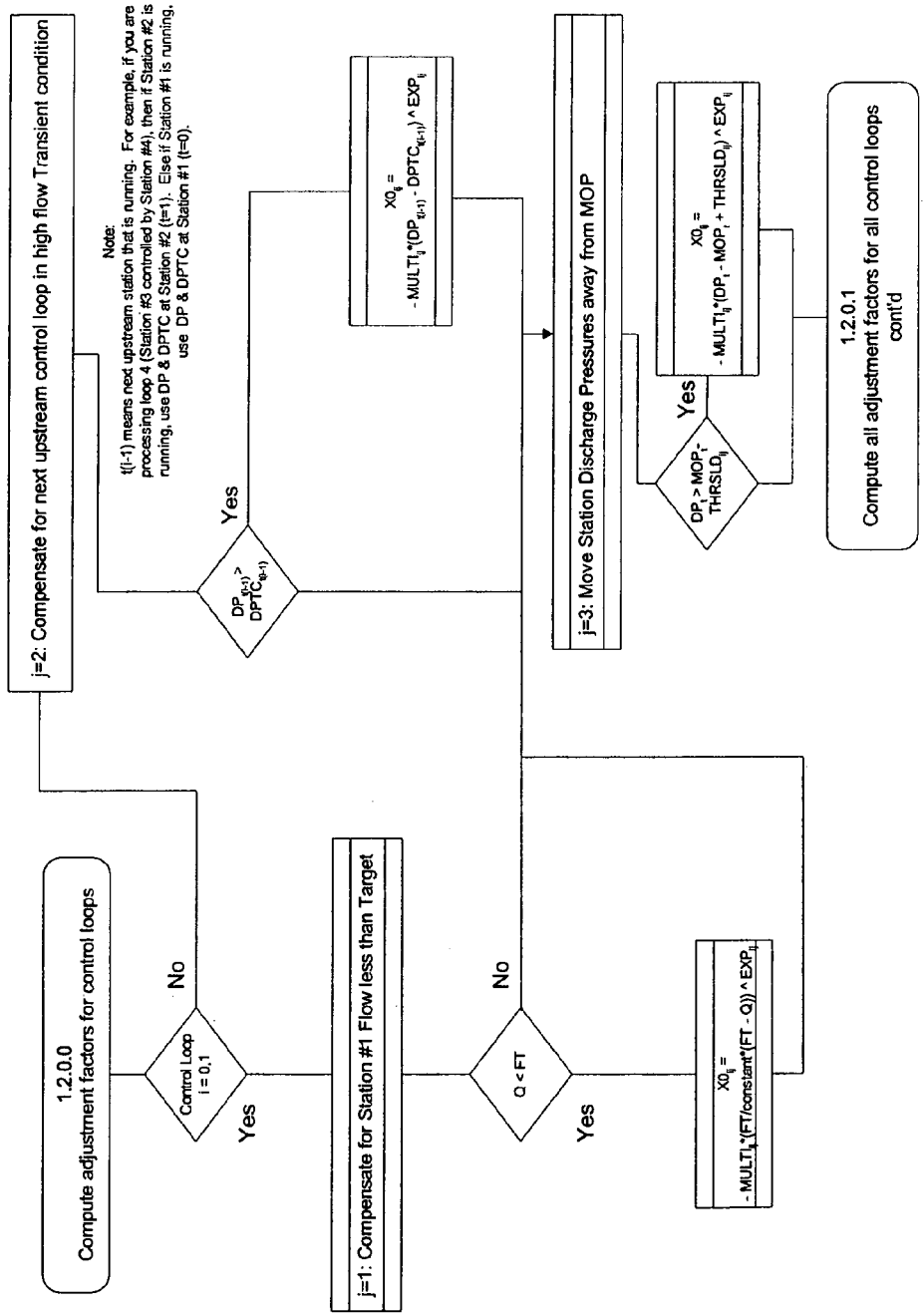
FIG. 9, FIG. 10, FIG. 11, and FIG. 13 are schematic flow diagrams illustrating expressions used to compute adjustment factors for various upset conditions.

FIG. 9 is a schematic flow diagram illustrating the calculation of the first through third adjustment factors (j=1, j=2, and j=3). As was described above, the first adjustment factor relates to the upset condition in which the flow at the intake point in the pipeline is less than the target flow. In this upset condition, it is assumed that the gas supplier will eventually increase the flow into the pipeline so as to meet their contractual obligations. Therefore, in the case of low flow at the intake, systems according to the invention lower the discharge pressure target at the intake. This creates capacity in the system downstream to accommodate the gas that will be pumped into the system later. It also reduces the stress on the compressors as the gas is added at increased flow rates later. The expression used to calculate the first adjustment factor is shown in FIG. 9. Descriptions of the variables used in FIG. 9 are given below in TABLES 1 and 2.

As was described above, the second adjustment factor relates to the upset condition in which the discharge pressure is greater than the target discharge pressure. When the discharge pressure is greater than the target discharge pressure, systems according to embodiments of the invention lower the target discharge pressure at downstream compressor stations. This causes downstream compressors to speed up faster and reduces excess linepack. Essentially, it improves the response time of the system. The expression used to calculate the adjustment factor is shown in FIG. 9.

The third adjustment factor, the calculation of which is also shown in FIG. 9, relates to the upset condition in which a discharge pressure at one of the compressor stations is close to the maximum operating pressure in the pipeline. As those of skill in the art will appreciate, having the discharge pressure at a compressor station at a pressure close to the maximum operating pressure is generally an undesirable condition. Therefore, in this condition, the system lowers the target discharge pressure at downstream compressor stations so that the downstream compressors will "pull" the pressure away. The expression used to calculate the adjustment factor is shown in FIG. 9.

Figure 10:
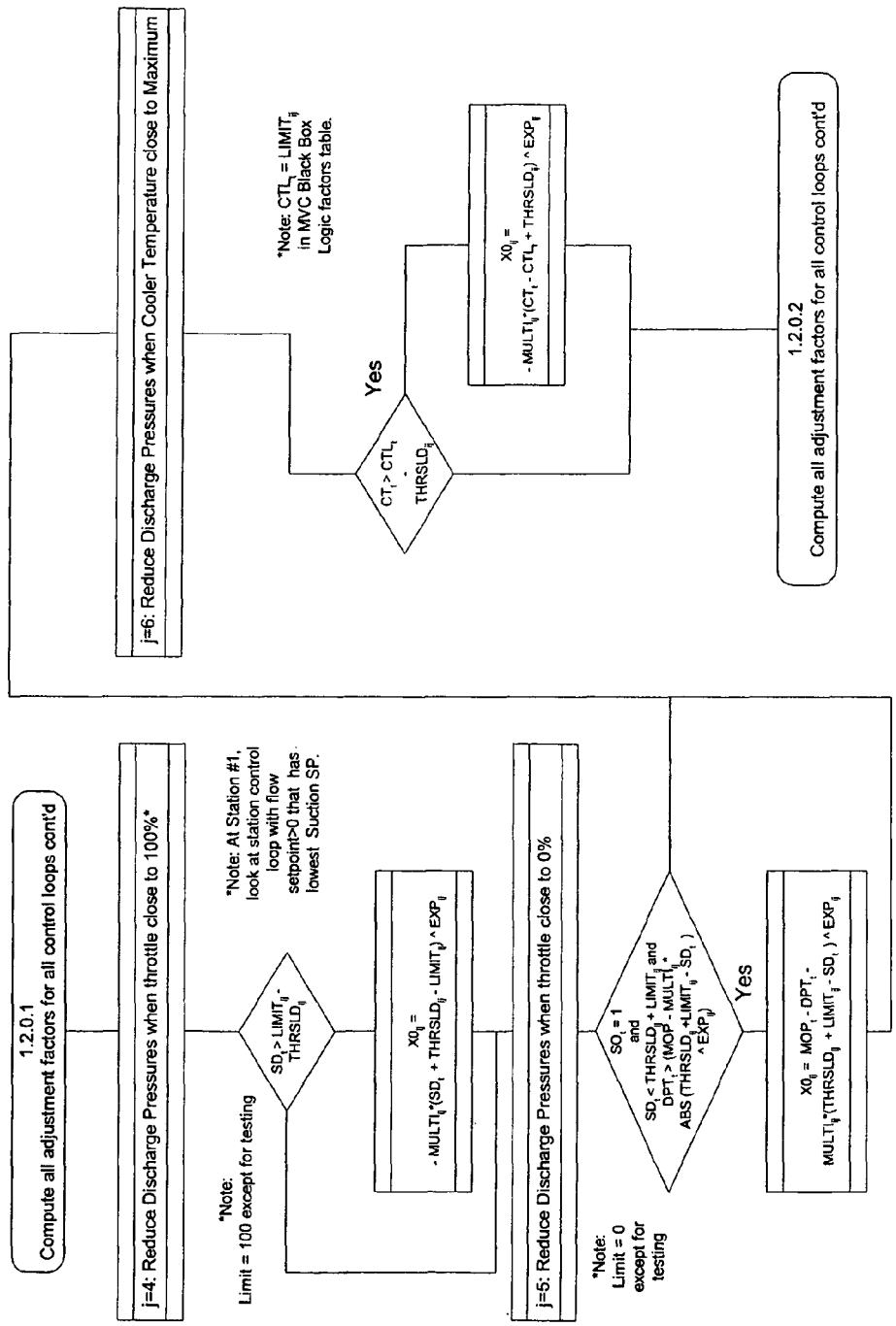

FIG. 10 is a schematic flow diagram illustrating the calculation of the fourth, fifth, and sixth adjustment factors (j=4, j=5, and j=6). As was described above, the fourth adjustment factor relates to the upset condition in which the throttle or speed driver of one or more of the compressors is close to 100%. Therefore, in this condition, the system lowers the target discharge pressure downstream, which reduces the speed driver or throttle of the downstream compressors and allows the supply pressure to control the pressure in the pipeline. The expression used to calculate the adjustment factor is shown in FIG. 10. Descriptions of the variables used in FIG. 10 are given below in TABLES 1 and 2.

The fifth adjustment factor relates to the upset condition in which the throttle or speed driver of one or more of the compressors is close to 0%. When the speed driver is close to 0%, the discharge pressure is constrained and will not be able to decrease. In this condition, the system lowers the discharge pressure target, which creates more available capacity downstream in the pipeline. Then if a compressor station down stream should crash, there will be sufficient time to recover before the station near 0% speed driver also crashes due to over pressure. The expression used to calculate the adjustment factor is shown in FIG. 10.

The sixth adjustment factor relates to the upset condition in which the cooler temperature is close to maximum. When the cooler temperature is close to maximum, the suction pressure is constrained and will not be able to decrease. In this condition, the system lowers the discharge pressure target, which reduces the compression ratio and lowers the discharge temperature unconstraining the suction pressure. The expression used to calculate the adjustment factor is shown in FIG. 10.

Figure 11:
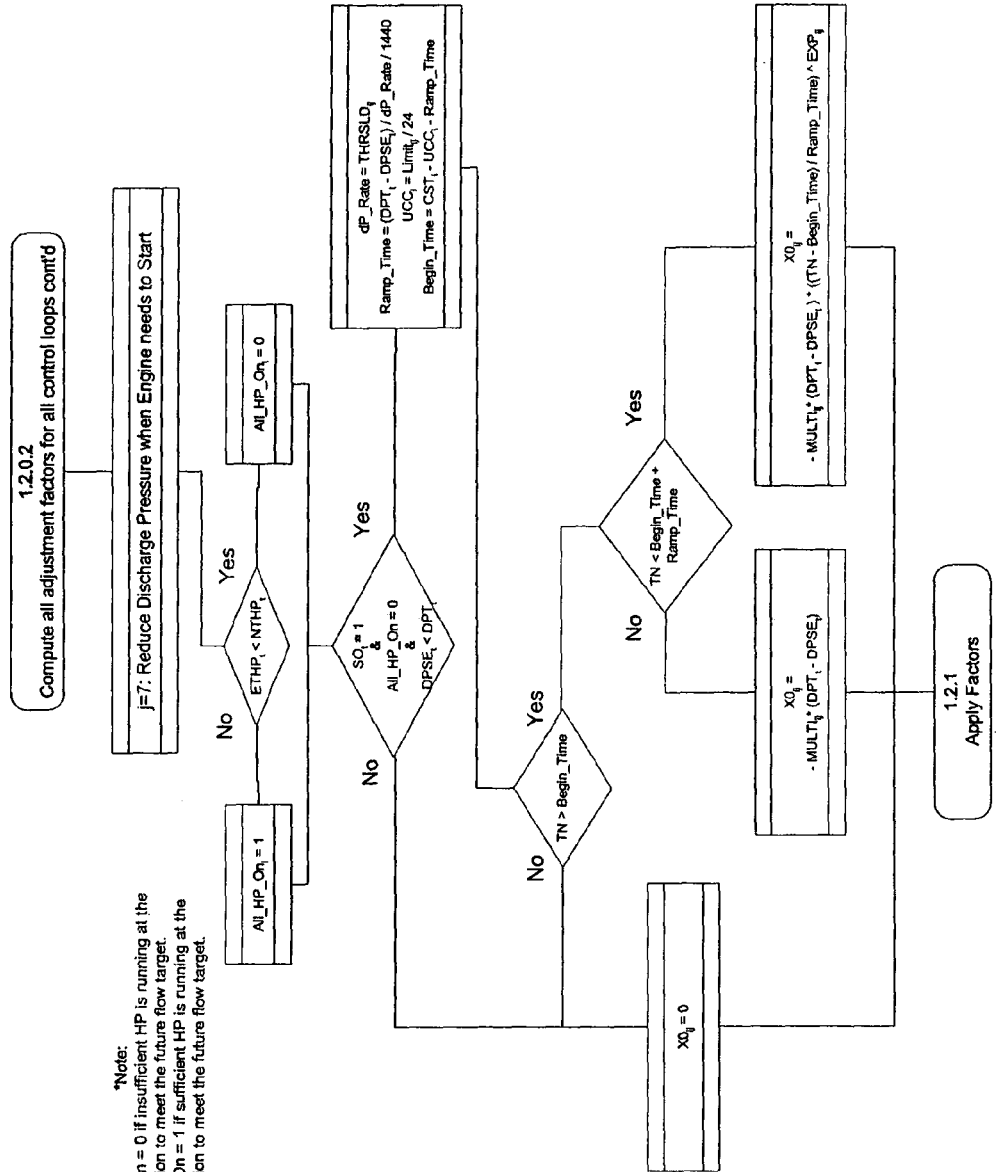

FIG. 11 is a schematic flow diagram illustrating the calculation of the seventh adjustment factor (j=7). As was described above, the seventh adjustment factor relates to the upset condition in which an engine needs to start in a station that is already running. When an engine needs to start in a station that is already running, the station controller will not allow the engine to start if the discharge pressure is greater than the limit for starting engines. In this condition, if the discharge pressure is greater than the limit for starting an engine, the system reduces the discharge pressure in time to start the engine. The expression used to calculate the adjustment factor is shown in FIG. 11.

Figure 13:
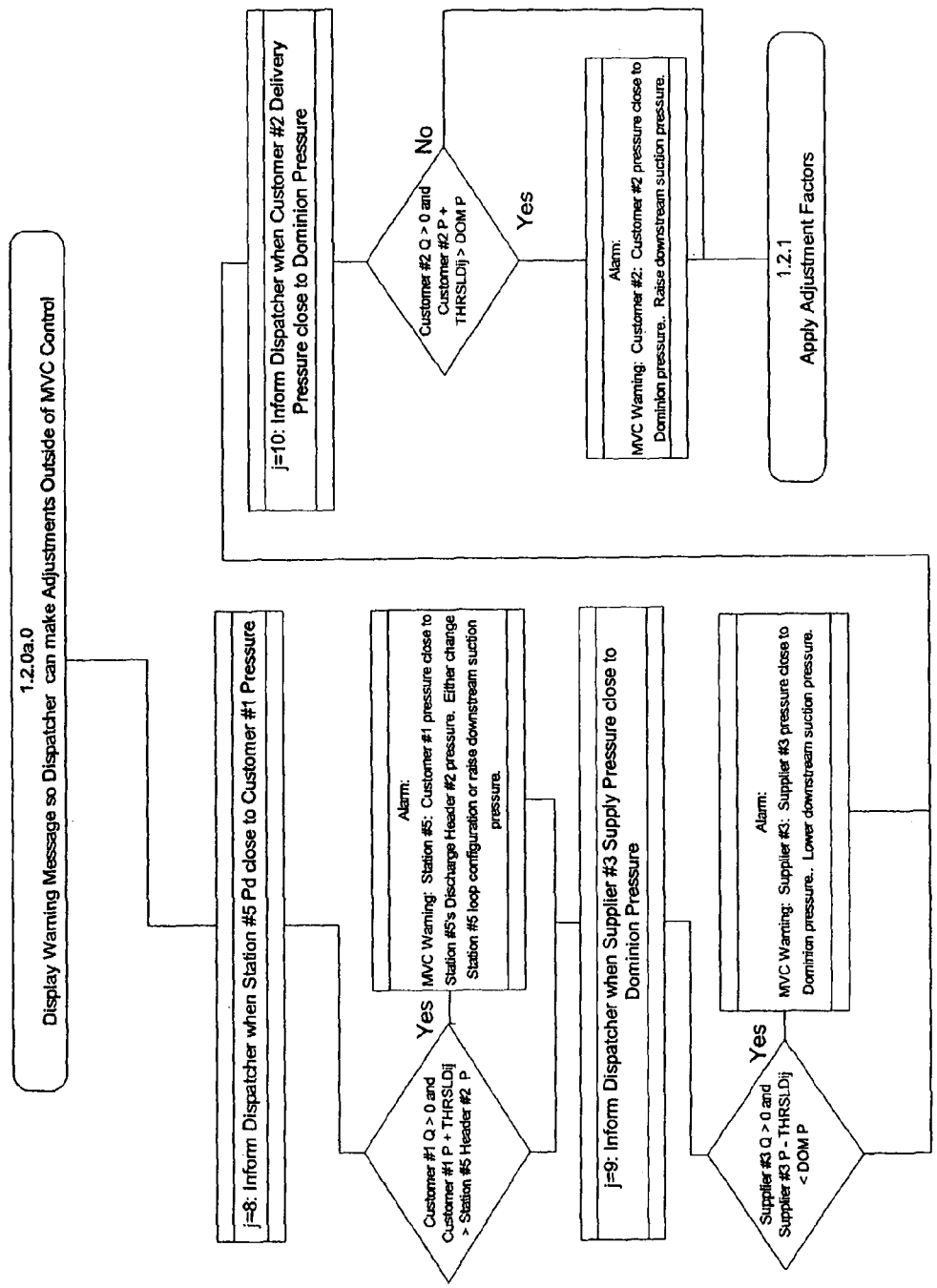

FIG. 13 is a schematic flow diagram illustrating the calculation of the eighth, ninth, and tenth (j=8, j=9, and j=10). The eighth adjustment factor relates to an upset condition for which automatic handling is not available, although in some embodiments, the system might handle the upset condition automatically, at least to some extent. In the upset condition to which the eighth adjustment factor relates, the pressure at a particular point in the pipeline ("Station #5", as identified in FIG. 13) is close to the limiting pressure required by a customer ("Customer #1", as identified in the figure). (More particularly, the algorithm queries whether a particular transmission line is flowing to the supplier and, if so, to what degree a valve is open.) If the condition is true, a warning such as, "Customer #1 pressure close to Station #5's discharge header #2 pressure. Either change Station #5 loop configuration or raise downstream suction pressure," may be provided. The expressions used to calculate the eighth adjustment factor are shown in FIG. 13. The ninth and tenth adjustment factors also relate to pressure and flow upset conditions within the pipeline that might make it difficult for the pipeline to supply a particular flow rate of gas at a particular pressure so as to meet contractual obligations. In each case, the operator is provided with a warning similar to that described above, and appropriate action is taken. The expressions used to calculate the ninth and tenth adjustment factors are shown in FIG. 13.

As those of skill in the art will note, the first seven adjustment factors deal with transient conditions in the pipeline that can be controlled by the pipeline control system, whereas the eighth, ninth and tenth adjustment factors deal with upset conditions that are outside the scope of control of the pipeline control system. Although this distinction applies in the present example and may not apply in all embodiments of the invention, the capacity of software, systems, and methods according to the invention to indicate possible problems in the pipeline that are beyond the scope of the multivariable control system logic to handle may be a beneficial feature. Additionally, as was noted above, the multivariable control system may also be programmed to handle the kinds of upset conditions represented by the eighth, ninth and tenth adjustment factors. Furthermore, the additional adjustment factors may be factors required for or desirable in specific pipelines or in specific configurations of software, systems and methods according to the invention.

TABLE 1

| Variables: | Description: |
|---|---|
| Q | Flow Rate value into Station #1 (MMCFD) |
| FT | Flow Target now into Station #1 (MMCFD) |
| FFT | Future Flow Target into Station #1 (MMCFD) |
| c | # of Compressor Station: Station #1 = 0, Station #2 = 1, Station #3 = 2, Station #4 = 3, Station #5 = 4, Station #6 = 5 |
| s | # of Downstream Compressor Station whose Target Discharge Pressure is controlled by Control Loop |
| t | # of Upstream Compressor Stations whose upstream of a station in Event Mode. |
| Event_Offset | Discharge Pressure Target Offset for stations upstream of a station in Event Mode. |
| TN | Current Time (Microsoft Excel Datetime format current time value adjusted to MVC time) |
| TS | Time Start Time future flow target becomes effective (Datetime format) |
| TB | Time Flow Target is computed to Begin increasing from prior value to future value (Datetime format) |
| TE | Time Flow Target is computed to reach future value (Datetime format) |
| LT | Lead Time (Deed Band) |

| Value | Controlled Discharge | Manipulated |
|---|---|---|

TABLE 1-continued

| i (Control Loop) | t | Pressure Target | s | Suction Pressure |
|---|---|---|---|---|
| 0 | 0 | Station #1 | 1 | Station #2 |
| 1 | 0 | Station #1 | 2 | Station #3 |
| 2 | 1 | Station #2 | 2 | Station #3 |
| 3 | 1 | Station #2 | 3 | Station #4 |
| 4 | 2 | Station #3 | 3 | Station #4 |
| 5 | 2 | Station #3 | 4 | Station #6 |
| 6 | 3 | Station #4 | 4 | Station #5 |
| 7 | 3 | Station #4 | 5 | Station #6 |
| 8 | 4 | Station #5 | 5 | Station #6 |

| j | Value | Adjustment Factor: | Description |
|---|---|---|---|
| | 0 | | Adjust Flow Target for New Nomination |
| | 1 | | Compensate for Station #1 flow less than target |
| | 2 | | Compensate for upstream station in high flow transient condition |
| | 3 | | Move station discharge pressures away from MOP |
| | 4 | | Reduce discharge pressure when throttle close to 100% |
| | 5 | | Reduce discharge pressure when throttle close to 0% |
| | 6 | | Reduce Discharge Pressures when Cooler Discharge Temperature close to Maximum |
| | 7 | | Reduce Discharge Pressure when when Engine needs to Start |
| | 8 | | Inform Dispatcher when Station #5 Pd close to Customer #1 pressure |
| | 9 | | Inform Dispatcher when Supplier #3 Supply pressure close to Dominion pressure |
| | 10 | | Inform Dispatcher when Customer #2 Delivery pressure close to Dominion pressure |

TABLE 2

| | Description: |
|---|---|
| 1-D Array Variables: | |
| $SO_c$ | 0: Station is Bypassed 1: Station has at least one unit Online on a loop controlled by MVC |
| $ETHP_c$ | Total available HP of units that are running now at station |
| $NTHP_c$ | New Total HP computed by Transition when a Compressor needs to Start |
| $All\_HP\_On_c$ | 0: There is a future Transition that will require additional net HP to come online 1: No future HP increase is required |
| $ON_i$ | 0: Loop i is off 1: If MVC is running, then MVC is controlling Loop i |
| $UCC_i$ | Unit Change Cushion in Hours for lowering $DPT_t$ when a compressor needs to start. ($UCC_i = LIMIT_{ij}/24$) |
| $CST_j$ | Compressor Start Time (Datetime format) as computed in Transition Logic |
| $DP_t$ | Discharge Pressure Value at Controlled Station |
| $DPMT_t$ | Minimum Allowable MVC Pressure Target (OPLO from Engineer Screen 1) |
| $DPT_t$ | MVC Pressure Limit set by Dispatcher on MVCOC (MVC Operating Console) |
| $DPTC_t$ | Adjusted MVC Pressure Target sent to Loop Controller |
| $MOP_t$ | Maximum Operating Pressure (get from existing ONGDISP_MVCVAL1-6) at Controlled Station |
| $CT_t$ | Cooler Outlet Temperature |
| $CTL_t$ | Cooler Outlet Temperature Limit that overrides primary station controller setpoints |
| $SP_t$ | Suction Pressure Setpoint at manipulated station |
| $DPSN_t$ | Discharge Pressure Setpoint at upstream end of control loop when all down stream stations are in Normal Mode |
| $DPSE_t$ | Discharge Pressure Setpoint at upstream end of control loop when the down stream station needs to start an engine |
| $DPS_t$ | Most recent Discharge Pressure Setpoint that was sent to compressor station at upstream end of control loop |
| $SD_s$ | Speed Driver at controlled station (upstream) |
| $SPerror\text{-}limit_s$ | Maximum error allowed between $SP_t$ and $NEWSP_t$ before EVENT is dedaired |
| $NEWSP_s$ | Next desired suction setpoint as calulated on Engineer|screen |
| $HP\_A_s$ | Availabe HP at the station computed by summing the EMM computed HP for each unit that is now available in SCADA |
| $HP\_R_s$ | Required HP for the station as computed by Black Box first itteration after Dispatcher switches "Dispatcher Request MVC" = "ON" |
| $R_s$ | $R_s$ = 1 if Station is running (Flow Setpoint from SCADA > 0). Applies only to Relay Loop in multi loop Stations |
| 2-D Array Variables: | |
| $MULT_{ij}$ | Multiplier for DPTC adjustment (j > 0) or Expected average rate of change for Station #1 Discharge Pressure while FT is increasing (PSI/Minute) for Flow Target Adjustment (j = 0) |
| $EXP_{ij}$ | Exponent for DPTC adjustment or Flow Target Adjustment |
| $LIMIT_{ij}$ | Limit used in Flow Target Adjustment & Compressor Start Adjustment |

TABLE 2-continued

| | Description: |
|---|---|
| $THRSLD_{ij}$ | Threshold P, Q or SD at which $X_{ij}$ is computed |
| $n_{ij}$ | Damping factor: n is one less than the number of time cycles $X_{ni}$ is averaged over (0 <= n < 100) |
| $X0_{ij}$ | jth Adjustment factor for ith Control Loop at itme n = zero (now) |
| $X_{ni}$ | Table of n historical adjustment factors used for each of i control loops (n dimensioned from 0-99) |

Figure 14:
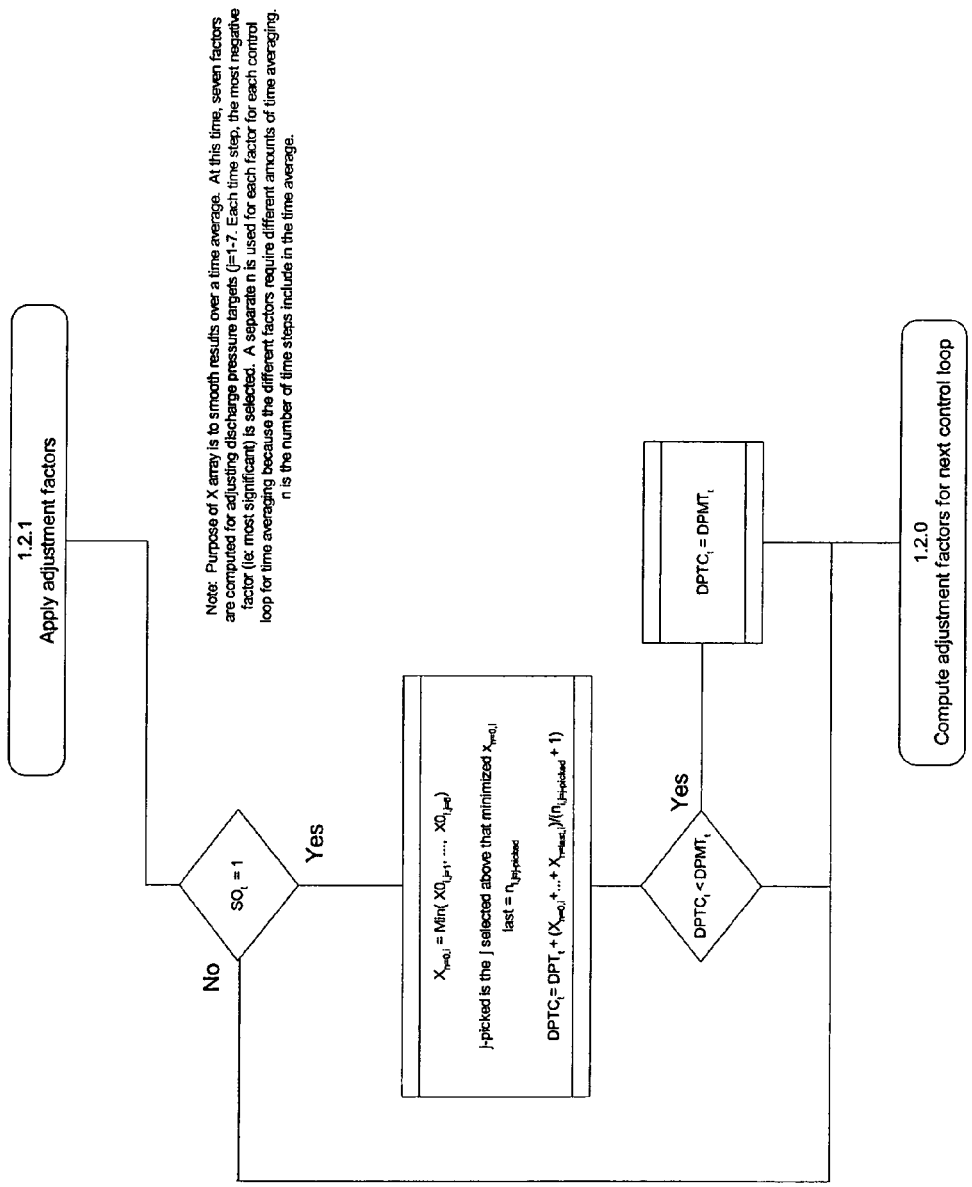
FIG. 14 is a schematic flow diagram illustrating the application of the computed adjustment factors to the pipeline flow control optimization system.
Figure 15:
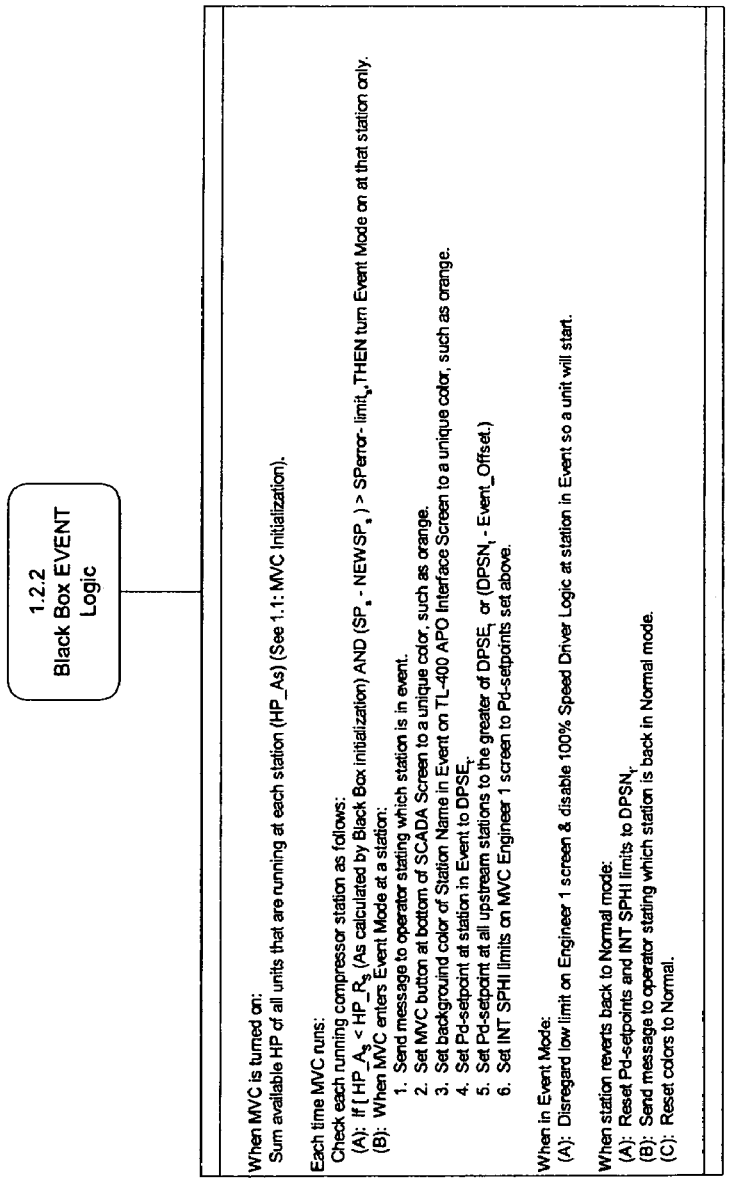
Figure 16:
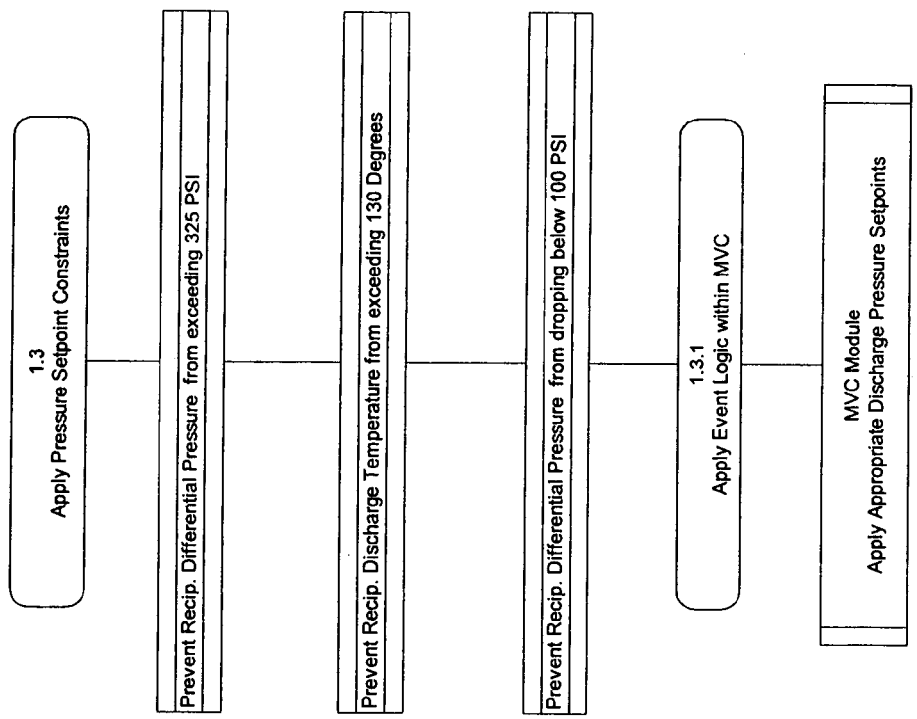
Figure 17:
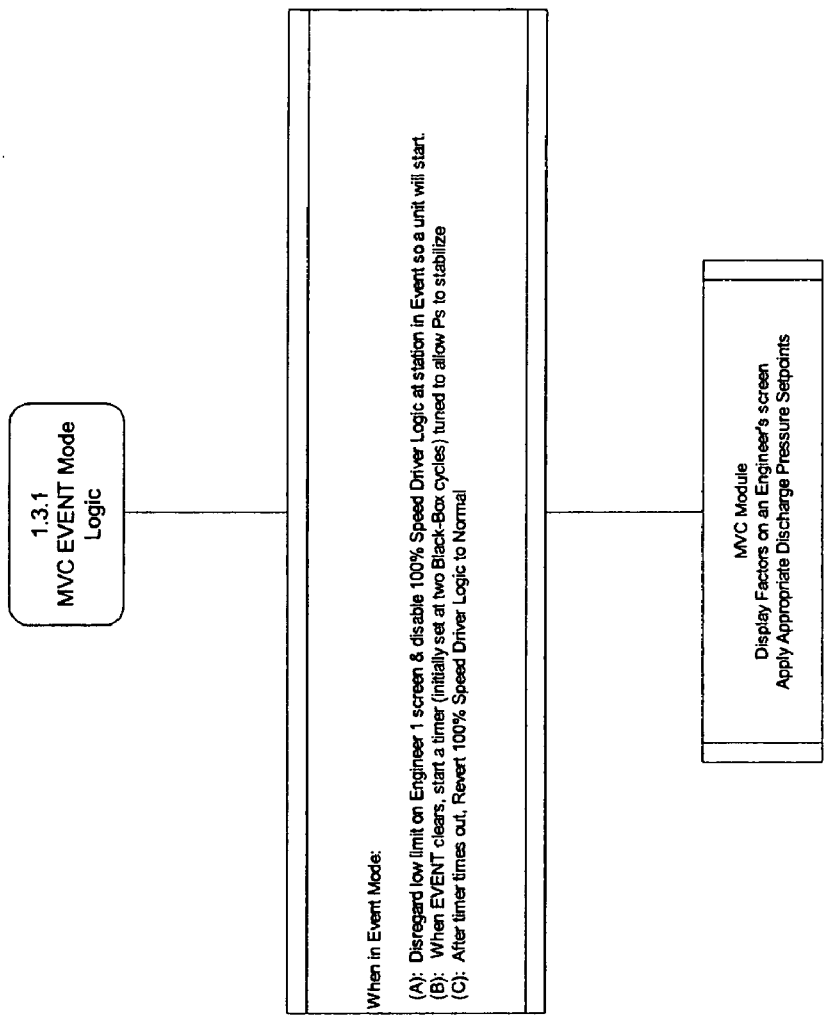

Once the various adjustment factors have been determined and stored in the array or other data structure, the system proceeds to determine which of the adjustment factors should be applied. The general process of applying the adjustment factors is shown in the schematic flow diagram of FIG. 14. In general, an adjusted discharge pressure target is calculated by adding a negative correction equal to the largest (e.g., most negative) of the adjustment factors to a discharge pressure limit which is the highest pressure desired in the pipeline. A time averaging technique is used to smooth the response. If the calculated adjusted pressure target is less than minimum allowable pressure, the calculated adjusted pressure target is set equal to the minimum allowable pressure. The adjusted pressure target is output to the multivariable controller, and the process continues by once again calculating a set of adjustment factors for the next cycle.

The foregoing describes the process of calculating ten adjustment factors, and, for ease of description, describes the process in certain respects as using one- and two-dimensional arrays or other data structures. However, as those of skill in the art will realize, each of the ten adjustment factors would generally be calculated for a plurality of points along the pipeline. For example, in the exemplary test system described above with six compressor stations, the ten adjustment factors may be calculated for each and every one of the compressor stations. Therefore, the array or data structure used to contain the data may be multidimensional. As shown by the index subscripts on the variables shown in the figures and described in TABLE 1, certain of the variables are expected to be multidimensional, although in a sufficiently simple system (e.g., one compressor station), they need not necessarily be multidimensional. Embodiments of the invention may also store past adjustment factors to use as predictive data for future calculations, for calibration, or for other purposes.

As was noted briefly above, although there are ten adjustment factors in this example, embodiments of the invention may calculate and take into account any number of adjustment factors.

Software, systems and methods according to embodiments of the invention are also configured to handle linepack transitions, which are changes in the amount of gas or liquid flowing in the pipeline. These linepack transitions are typically caused by changes in demand, although they need not be. (Those of skill in the art will note that some of the upset conditions described above, in effect, deal with linepack transition.) The linepack transitions may be predicted by the system by accessing past flow data and examining patterns in demand over time, or the system may be given an explicit warning by a human operator and the procedures initiated manually.

In general, the pseudocode or set of tasks involved in linepack transitions is as follows:

a. If pack increase:

Compare maximum power of compressors running now to maximum power of compressors proposed by the energy minimization module output (EMMO).

Using lowest horsepower configuration, compute minimum thru put and fuel usage when pumped from average of beginning and ending suction pressure to average of beginning and ending discharge pressure.

Determine time and quantity of fuel used to increase pack to correct level.

Run compressor station at this fuel rate until determined time.

b. If pack decrease:

Compare maximum power of compressors running now to maximum power of compressors proposed by EMMO.

Using highest horsepower configuration, compute maximum thru put and fuel usage when pumped from average of beginning and ending suction pressure to average of beginning and ending discharge pressure.

Determine time and quantity of fuel used to decrease pack to correct level.

Run compressor station at this fuel rate until determined time.

c. After Pack is set to correct level at each running compressor station as computed above, run compressor at flow rate and fuel usage level as determined by steady state EMMO solution.

Create EMMO Now and EMMO Future data bases

Use only compressor configuration of EMMO Now and Future databases in calculating time required.

Figure 18:
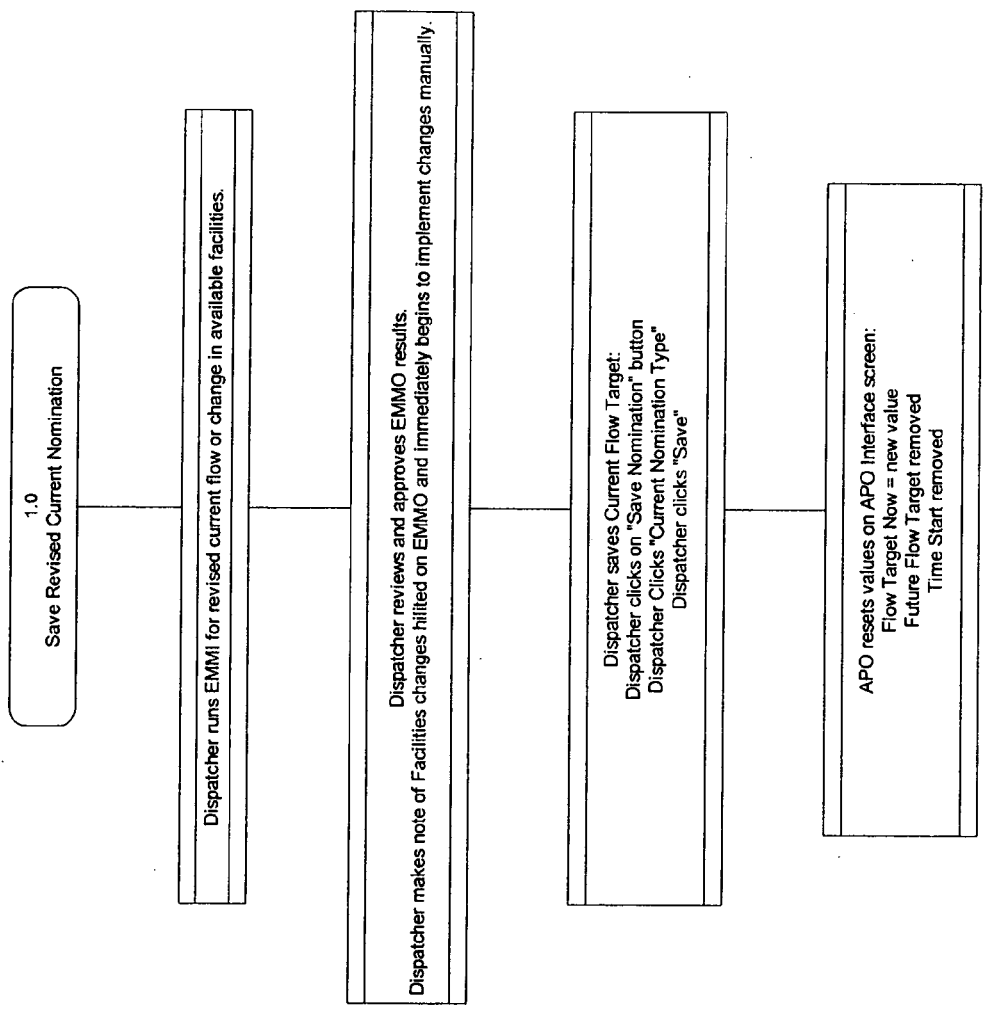
FIG. 18 and FIG. 19 show steps for saving a revised current nomination and a future nomination, respectively.
Figure 19:
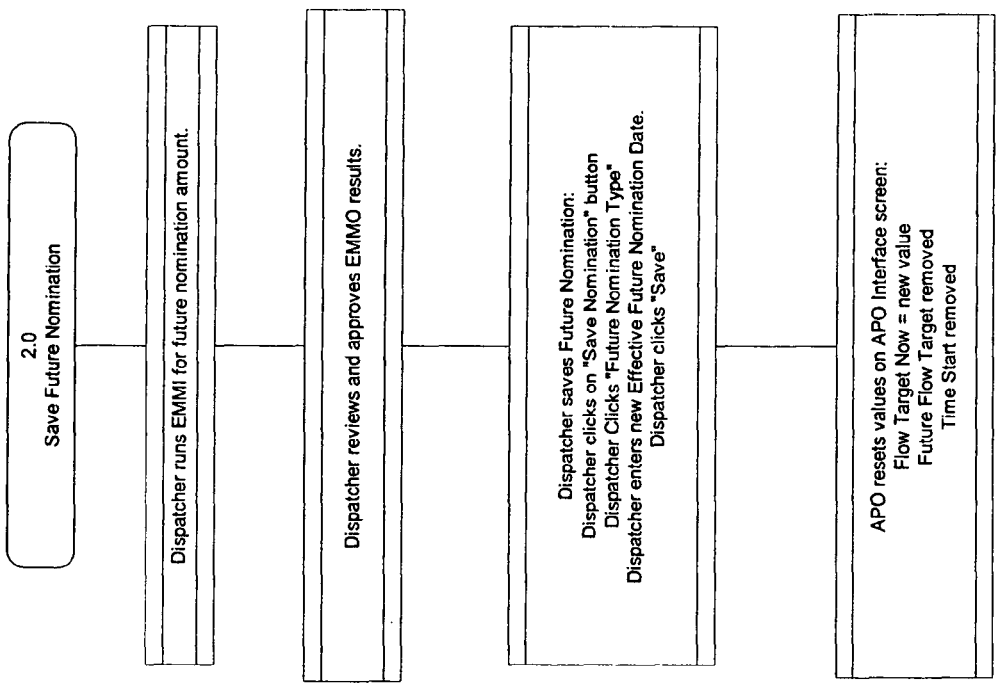
Figure 20:
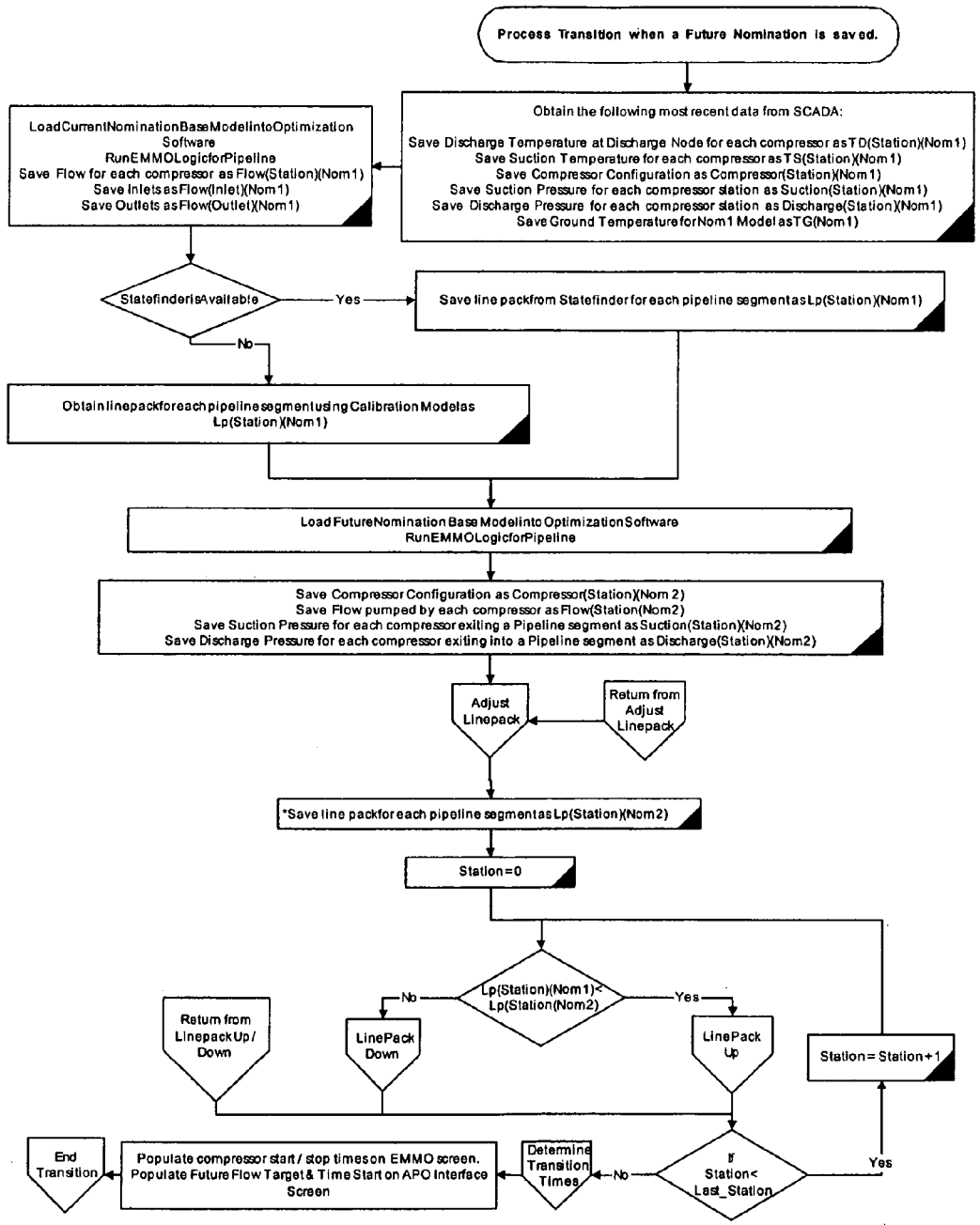
FIG. 20, FIG. 21, FIG. 22, FIG. 23, FIG. 24, and FIG. 25 are flow charts illustrating a transition process according to an embodiment of the invention.
Figure 21:
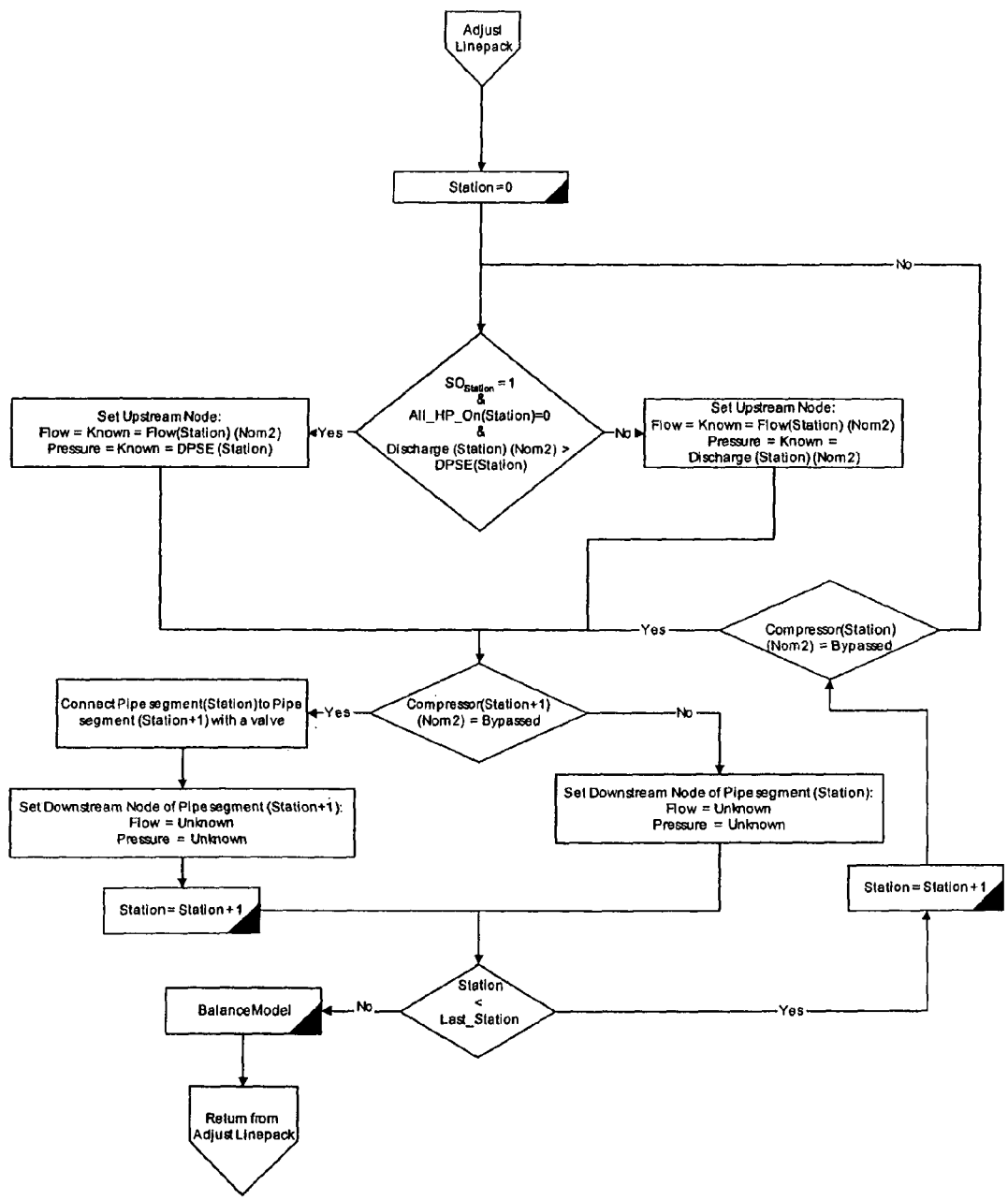
Figure 22:
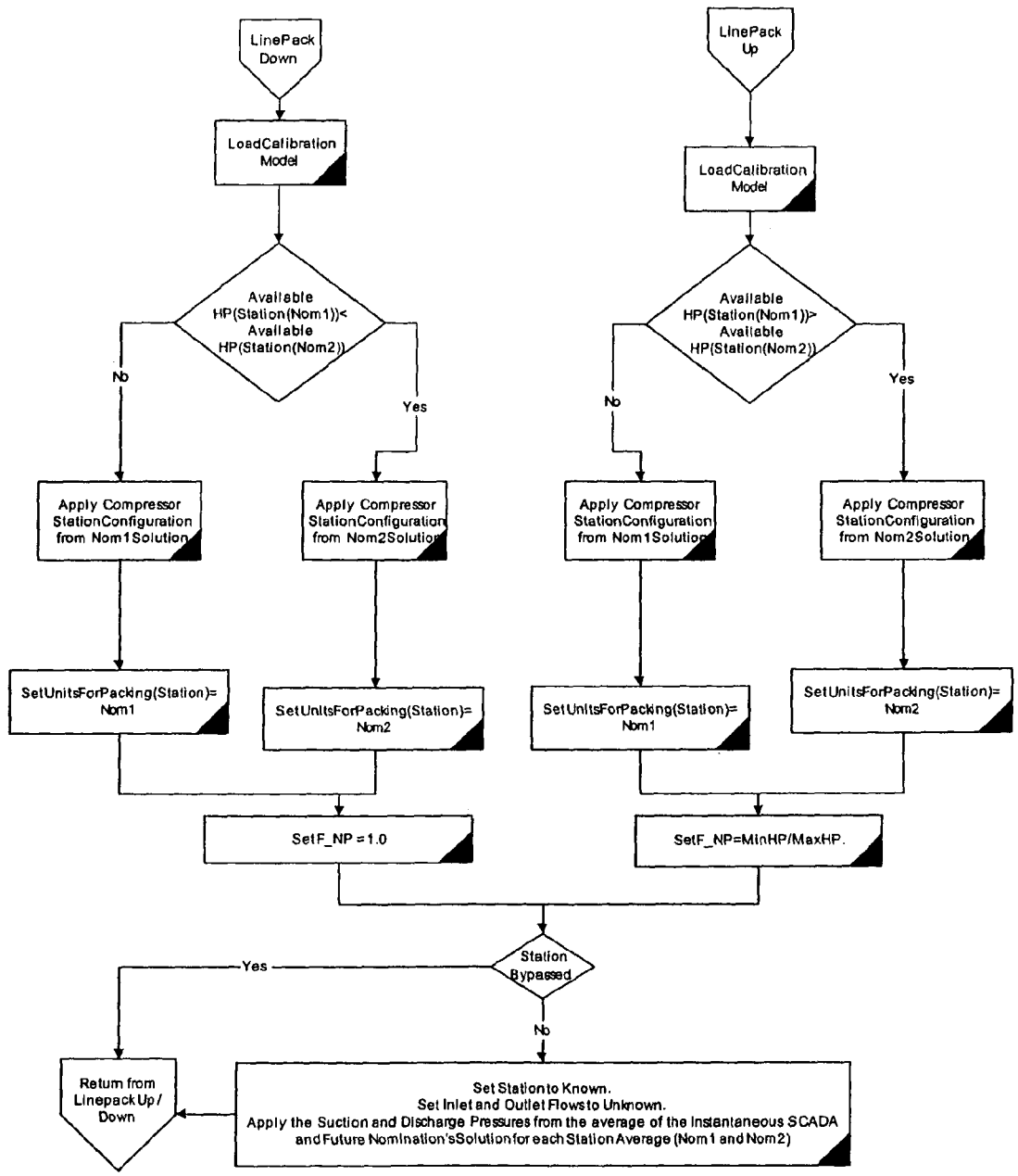
Figure 23:
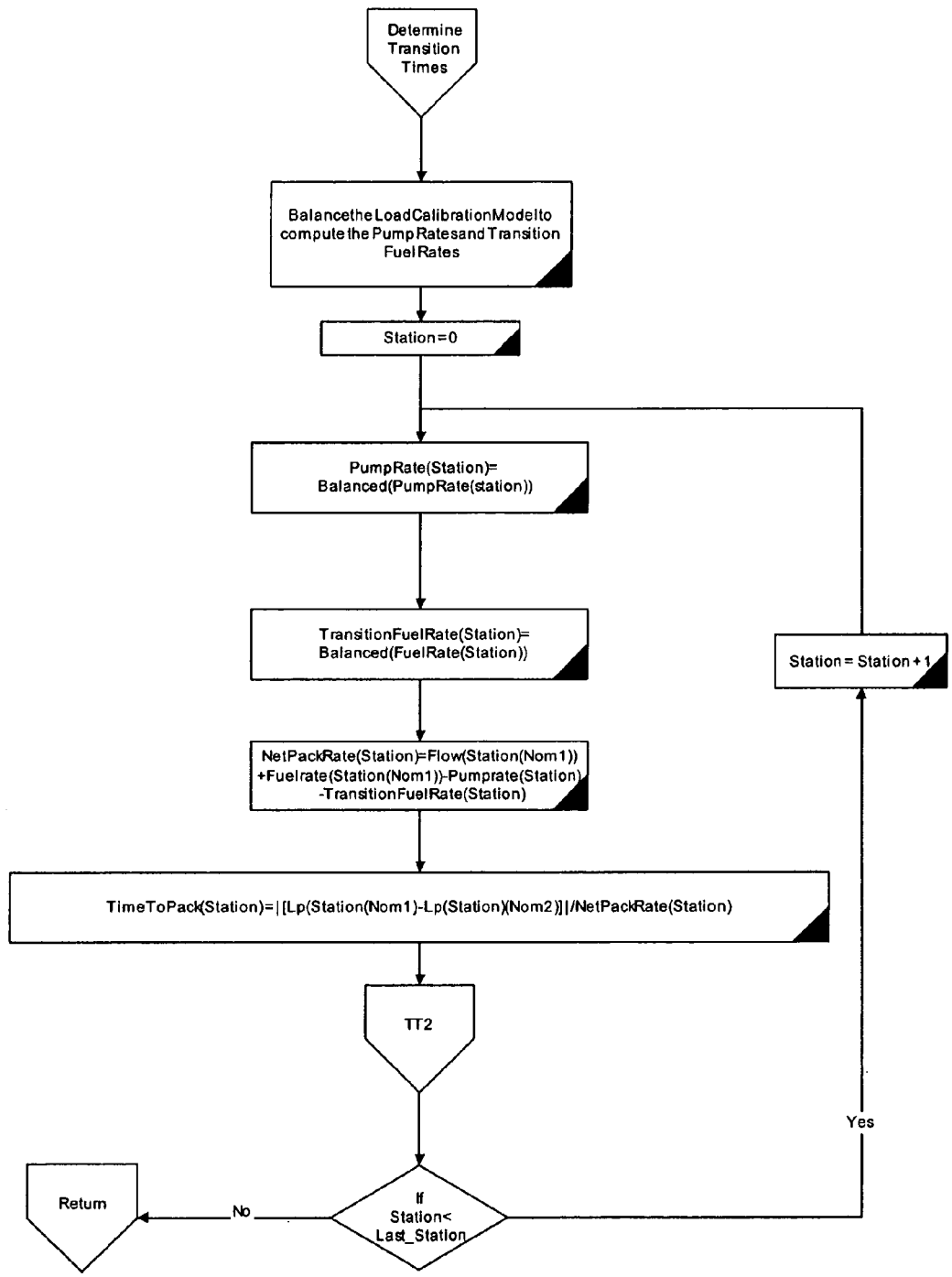
Figure 24:
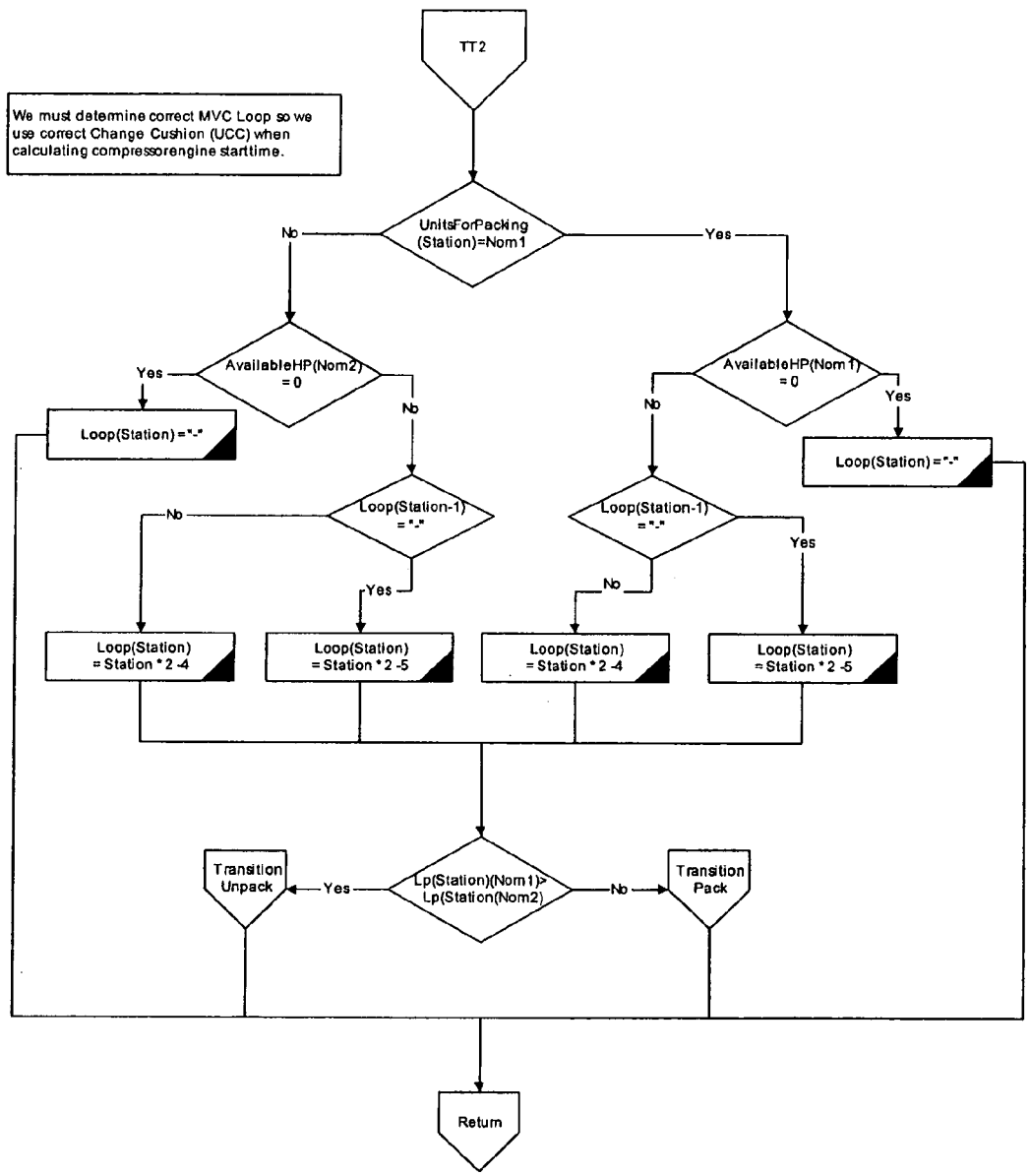
Figure 25:
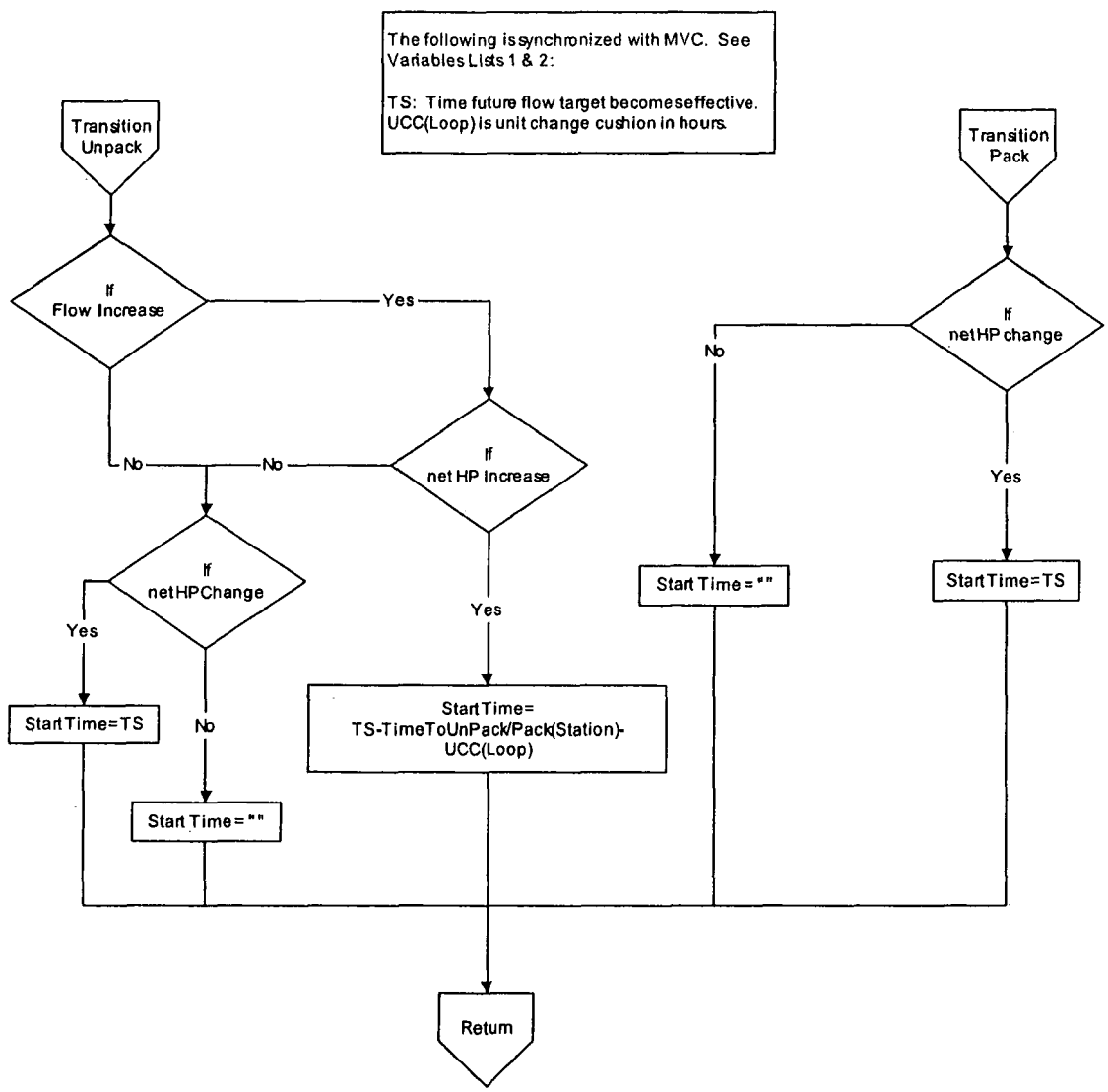

More specifically, FIG. 18 and FIG. 19 show steps for saving a revised current nomination and a future nomination, respectively. FIG. 20, FIG. 21, FIG. 22, FIG. 23, FIG. 24, and FIG. 25 are flow charts illustrating a transition process according to an embodiment of the invention.

Embodiments of the invention may also provide a number of administrative tools, as shown in FIG. 3. The administrative tools are useful in monitoring the performance of the system and in calibration of the models. An outline of the functions of the administrative tools is described below.

Tools used to monitor the performance of the system include (i) Fuel Attainment and (ii) Dispatcher Reporting. Fuel Attainment is an off-line tool that uses combinations of planned nomination data, system capabilities, historical measured data and pipeline models to determine the calculated fuel usage for the pipeline for given time periods. Results of the Fuel Attainment combinations can be compared to actual measured fuels and to each other to determine system efficiencies and root causes for inefficiencies. Fuel Attainment combinations include the following named results:

(i) Plan Optimum—Optimized amount of fuel that would have been calculated if full capabilities were available. (all Stations and Compressors are available for selection)

(ii) Plan—Optimized amount of calculated fuel given planned nomination data and available system capabilities at the time the optimization occurred.

(iii) Operational Optimum—Optimized amount of calculated fuel holding compressor configurations to their planned nomination settings, station targets to their respective maximum system capabilities, and using actual data for all other model inputs.

(iv) Flow Variance—Same as Operational Optimum while holding all flows external to the pipeline model constant at their planned rate.

(v) Temperature Variance—Same as Operational Optimum while holding all temperatures used in the model to their planned values.

(vi) Pressure Variance—Same as Operational Optimum while holding all inlet and outlet pressures used in the model to the planned values.

(vii) Pressure Target Variance—Same as Operational Optimum while holding all station targets to the planned values.

(viii) Units Used Variance—Same as Operational Optimum while holding all compressor usage to the planned values.

Dispatcher Reporting is an on-line tool that uses real-time and historical data, system capabilities along with pipeline models to determine the current calculated fuel efficiencies for the pipeline. This tool continually publishes current and summary shift efficiencies for dispatchers for display on SCADA terminals.

FIG. 33, FIG. 34, FIG. 35, and FIG. 36 are flow charts illustrating steps of a method for accurately measuring the fuel savings of the system according to an embodiment of the invention. Because of the various deliveries, supplies, and operating conditions, historic performance indicators such as fuel per volume pumped may be inappropriate to accurately measure fuel savings. Rather, a more accurate measurement may be obtained by dividing the optimal (calculated) fuel+ transition fuel by the actual fuel used.

Figure 37:
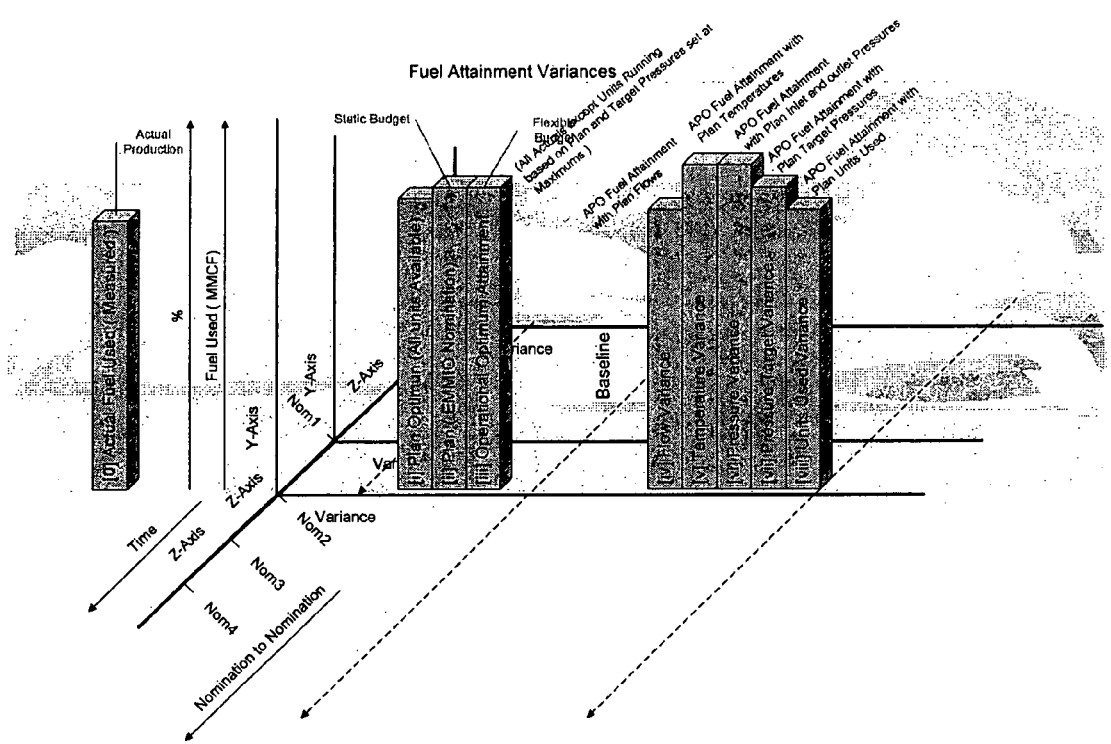
FIG. 37 shows fuel attainment variances that may be taken into account when measuring the fuel savings of the system according to an embodiment of the invention.

Additionally, accurately measuring fuel savings includes taking account of operational variances, such as when inputs into a forecasted optimization run vary from the actual inputs. For example, it is important to capture the fuel costs when a compressor goes down or is not available to run in the optimal solution. Costs may then be quantified to help determine whether to proceed with additional maintenance programs or capital expenditures. FIG. 37 shows fuel attainment variances that may be taken into account. Table 3 below provides definitions for the variances shown in FIG. 37.

TABLE 3

Variance Definitions

1. Planned Units Available Variance % = |[i] Plan Optimum – [ii] Plan|/[ii] Plan
2. Plan Attainment = [iii]Operational Optimum/[ii] Plan
3. Fuel Attainment = [iii] Operational Optimum/[0]Actual Fuel Used
4. Flow Variance % = |[iv] Flow Variance – [iii] Operational Optimum|/[iii] Operational Optimum
5. Temperature Variance % = |[v] Temperature Variance – [iii] Operational Optimum|/[iii] Operational Optimum
6. Pressure Variance % = |[vi] Pressure Variance – [iii] Operational Optimum|/[iii] Operational Optimum
7. Pressure Target Variance % = |[vii] Pressure Target Variance – [iii]Operational Optimum|/[iii] Operational Optimum
8. Units Used Variance % = |[viii] Units Used Variance – [iii] Operational Optimum|/[iii] Operational Optimum The tool used for calibrating the models is the Automated Calibration Tool, which is designed to give the engineers appropriate data to analyze and calibrate the models. To ensure reliable calibration, the system finds an appropriate steady state interval for calibration by ensuring that the pipeline data is sufficiently static and unchanging over a programmed number of consecutive hours. For example, the initial program may download actual data after automatically finding 6 consecutive hours of static operating conditions. Calculations relating to the models' data are then compared to actual data. These values are stored and the engineer is notified when the values fall outside of designed limits.

Included in the Automated Calibration Tool is:

(i) Segment Calibration—Compares model results to actual results for line segments. The parameters used to calibrate the model can include, but is not limited to:
  Efficiency
  Roughness
  Heat Coefficient
  Ground Temperature
  Gas Temperature (ii) Station Calibration—Compares model results to actual results for stations. Stations are comprised of differing compressor unit types and numbers. The calibration procedure will be a combination of station and unit level configurations. The parameters used to calibrate the model can include, but is not limited to:
  Inlet Pressure drop
  Outlet Pressure drop
  Temperature drop through coolers Reciprocating Units:
  Swept volume
  Compression Ratio
  Maximum and minimum clearance
  Maximum and minimum horsepower
  Heat rise coefficient
  Fuel
  Volume
  Mechanical efficiency factor
  Compressor efficiency factor Centrifugal Units:
  Maximum and minimum horsepower
  Head curve
  Mechanical efficiency factor
  Heat rise coefficient
  Fuel
  Volume (iii) Model Variance—Non-optimized amount of calculated fuel given actual system utilization, measured data, and pipeline models. Pipeline models for Model Variance are connected, unlike Station and Segment Calibration, which considers station and pipeline segments in isolation. The formula for Model Variance is:

$$Mvar(Nom) = Model(Nom, SystemUtil(Nom), Mdata(Nom)) - FuelActual(Nom)$$

Where:

Nom—Time-period between transient conditions.

SystemUtil(Nom)—Actual System Utilization during the nomination. (i.e. compressor statuses, station utilization, etc.

Mdata(Nom)—Average Measured data during the nomination.

Model(Nom,SystemUtil(Nom),Mdata(Nom))—A function that calculates unoptimized fuel usage for a given pipeline, nomination, system utilization, and measured data.

Mvar(Nom)—Calculated Model Variance during a nomination.

Figure 26:
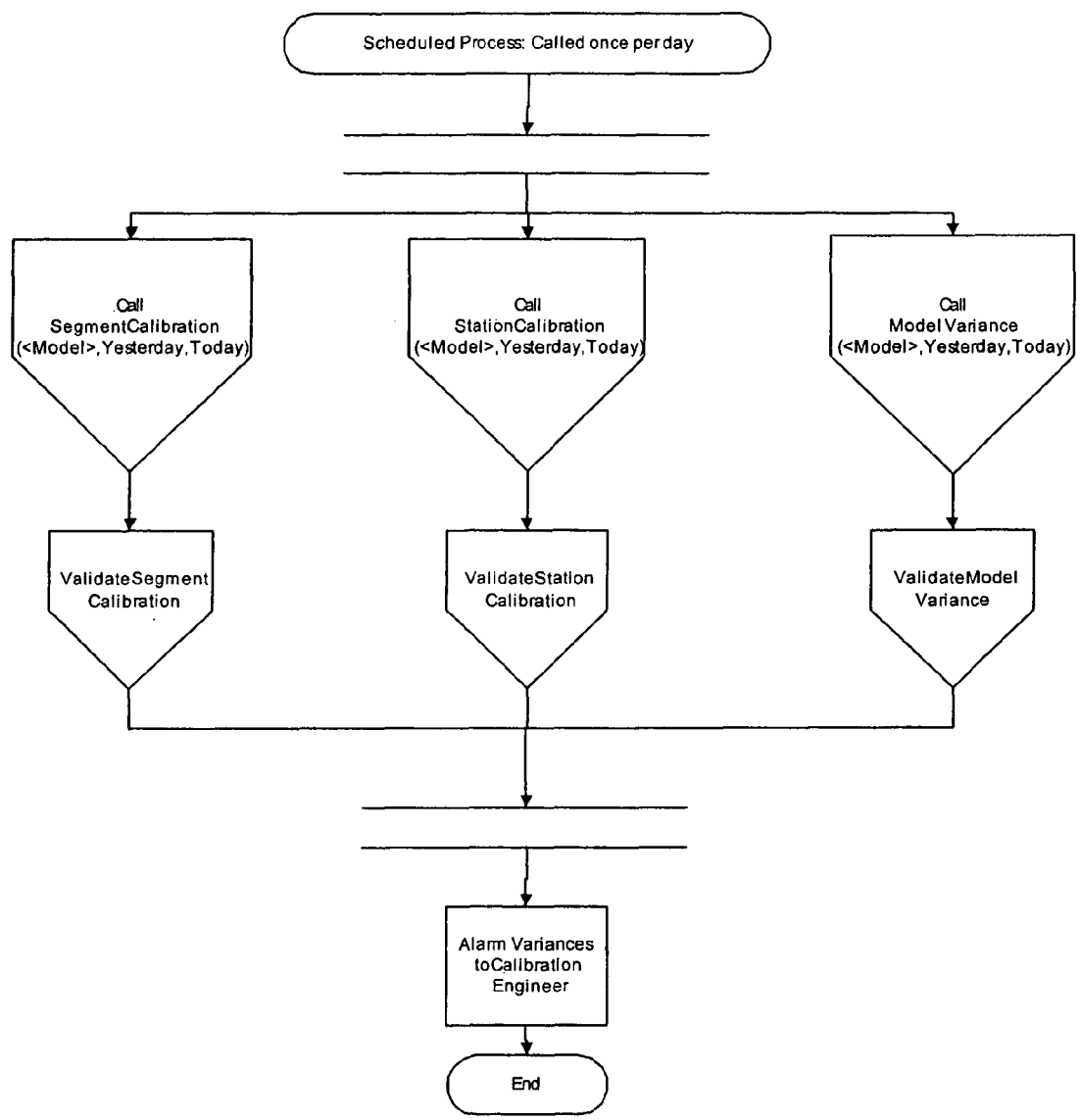
FIG. 26 shows general calibration processes that may be completed each day.
Figure 27:
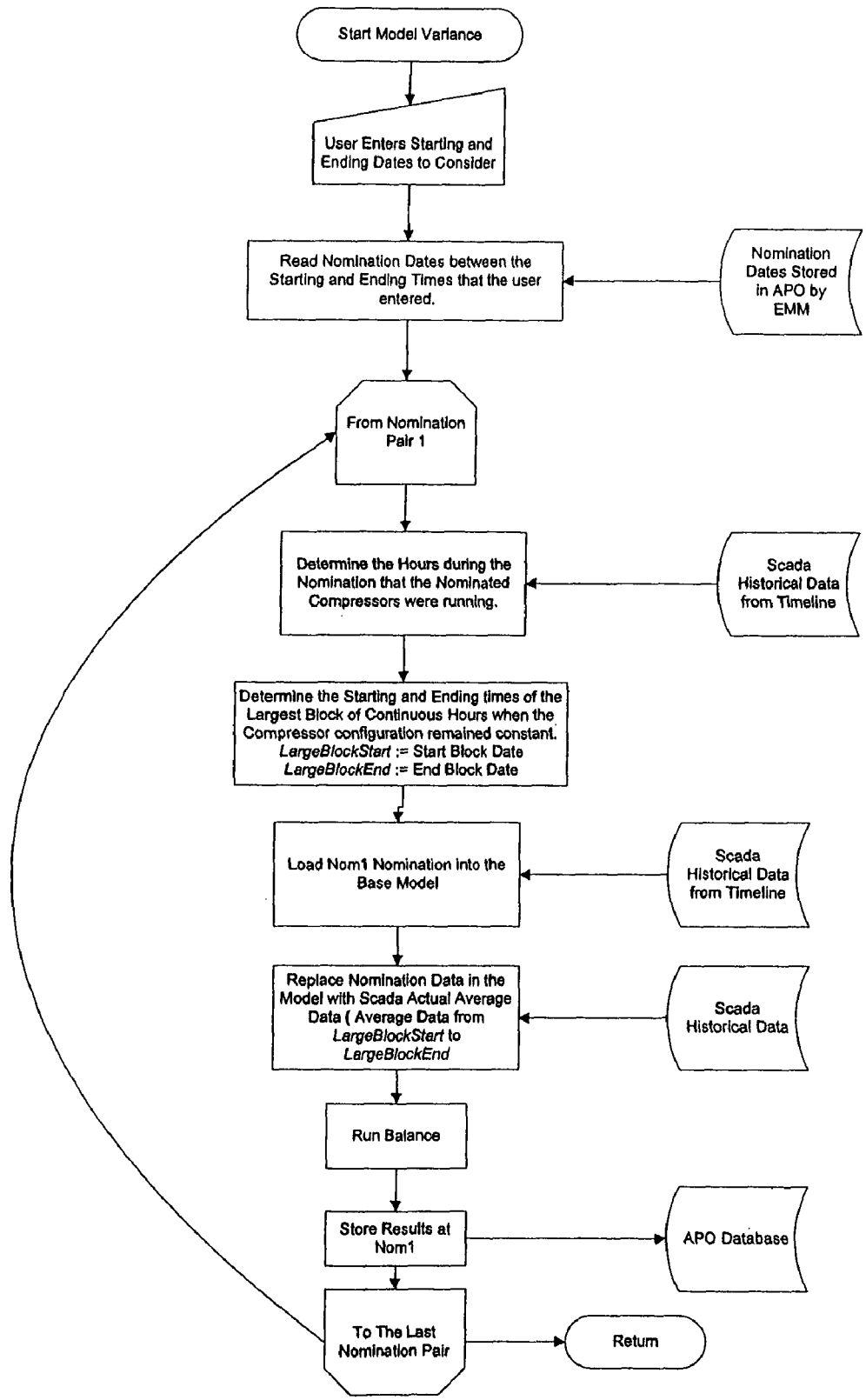
FIG. 27, FIG. 28, FIG. 29, FIG. 30, FIG. 31, and FIG. 32 are schematic flow diagrams illustrating tasks involved in calibrating the system according to an embodiment of the invention.
Figure 28:
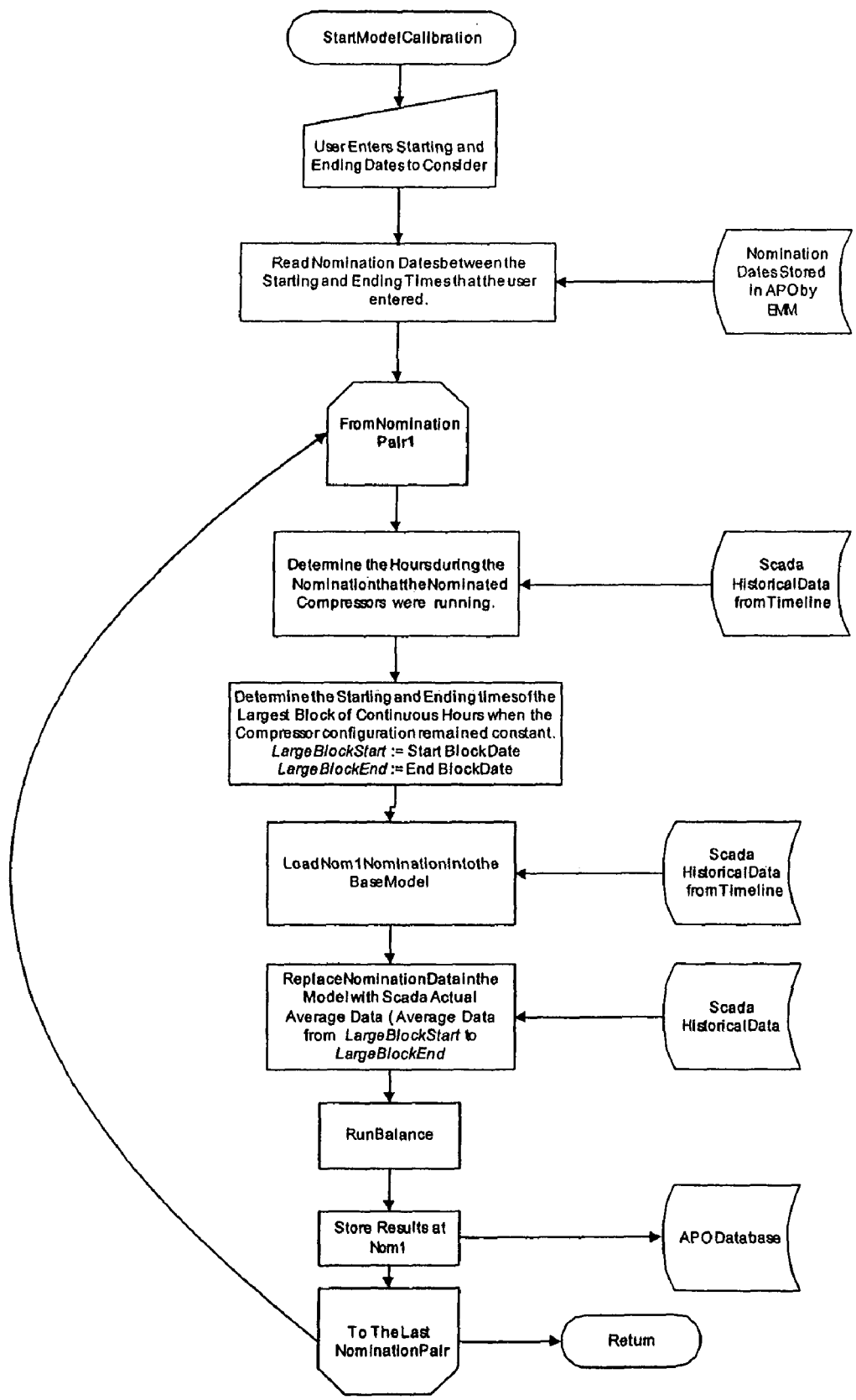
Figure 29:
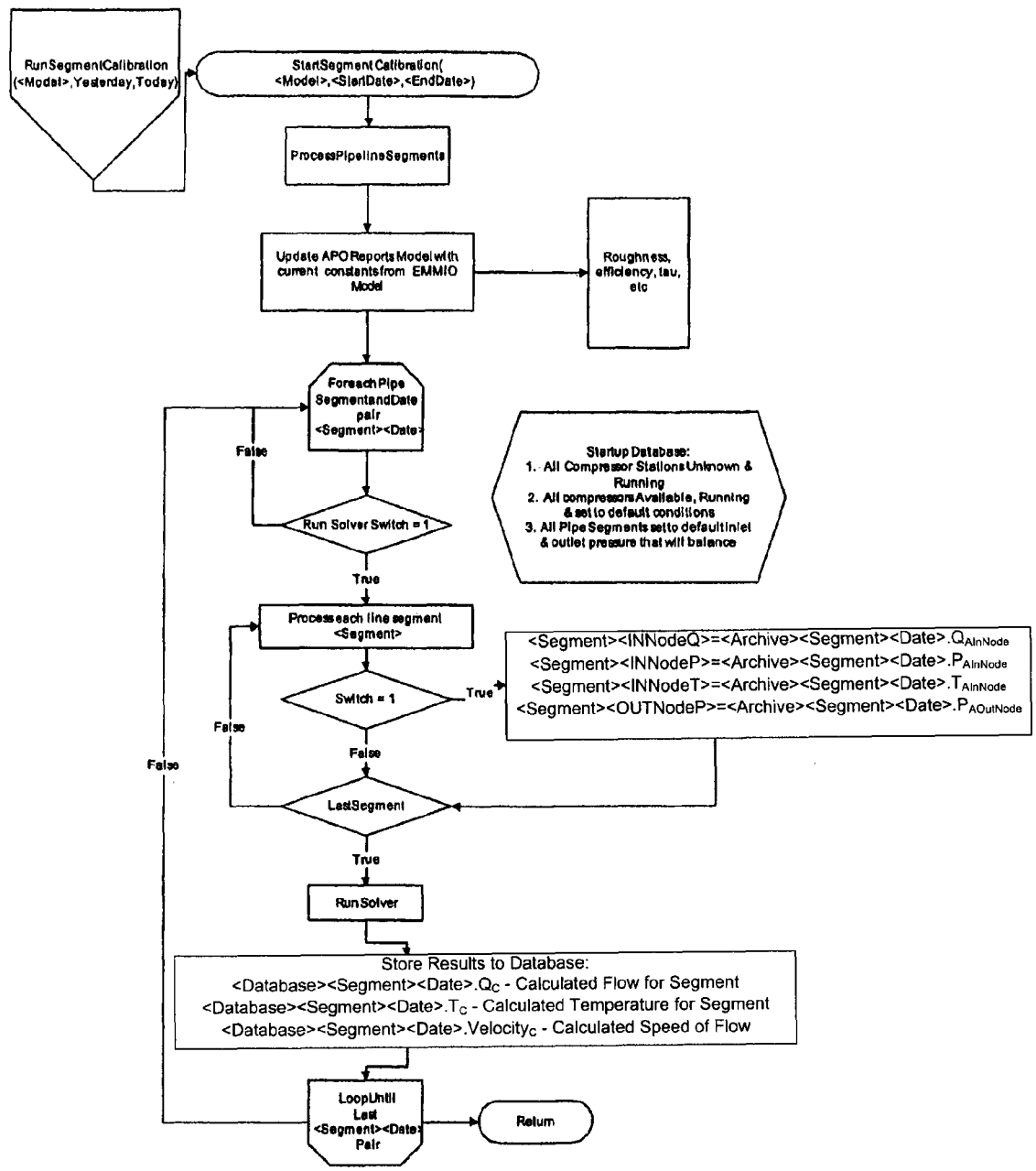
Figure 30:
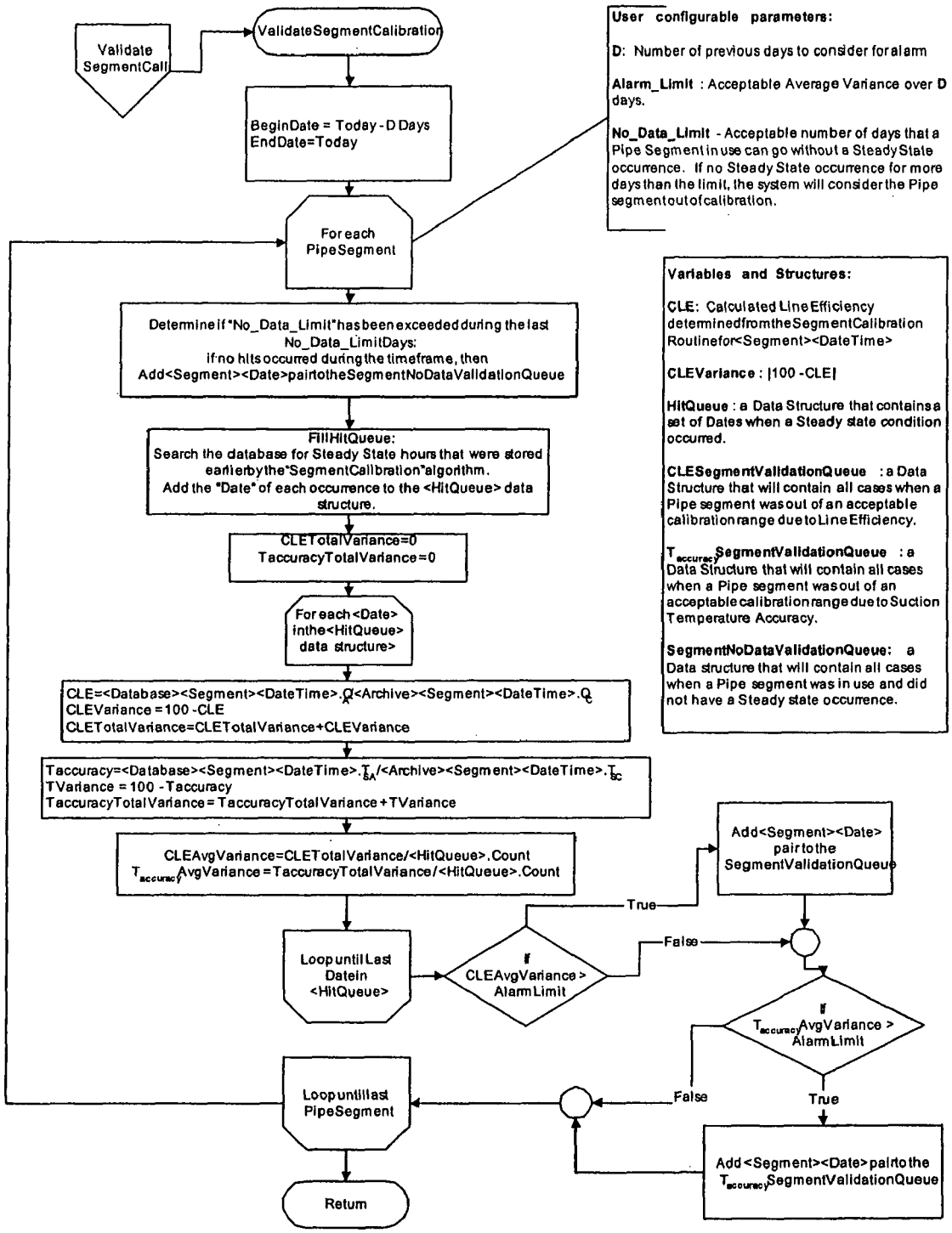
Figure 31:
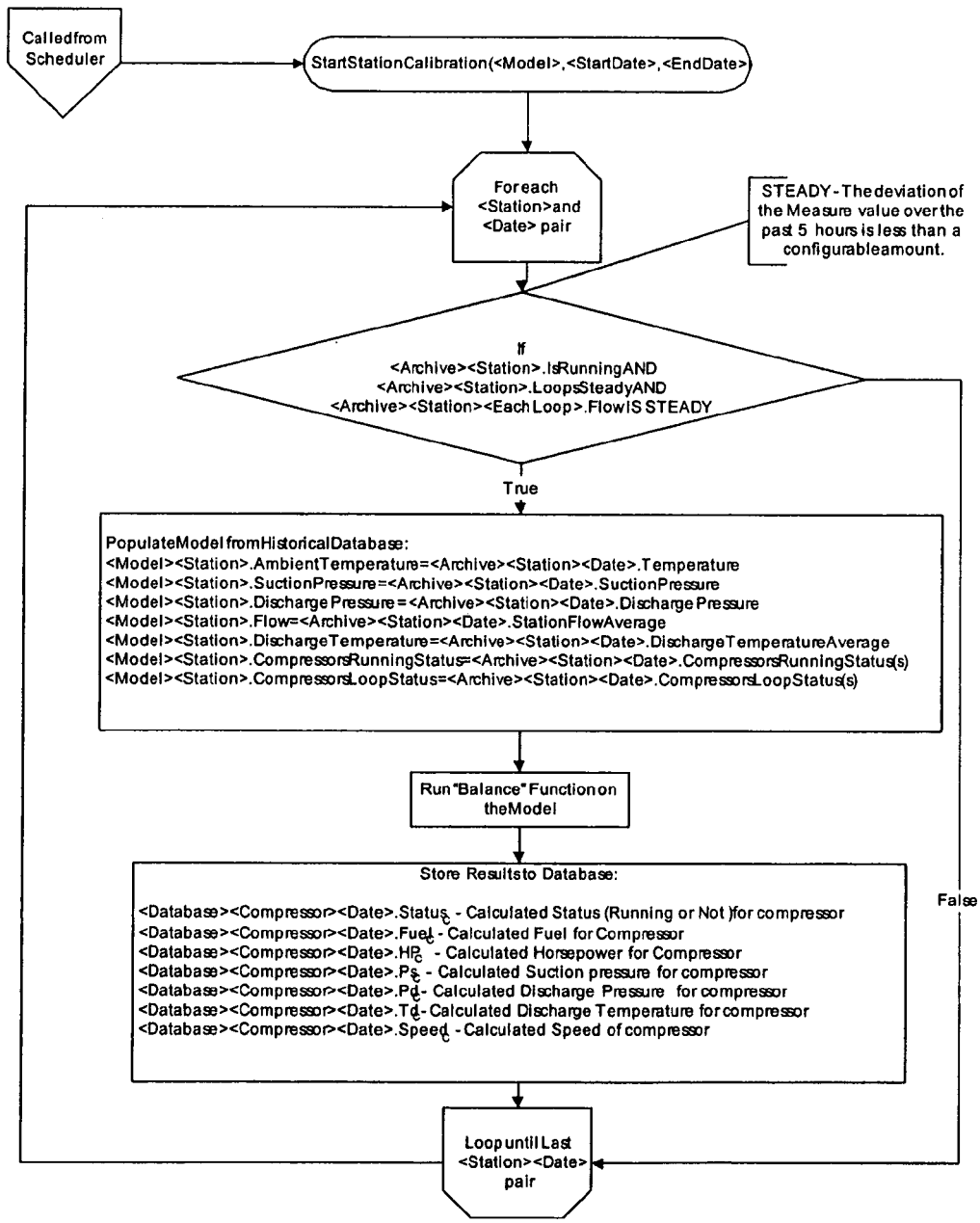
Figure 32:
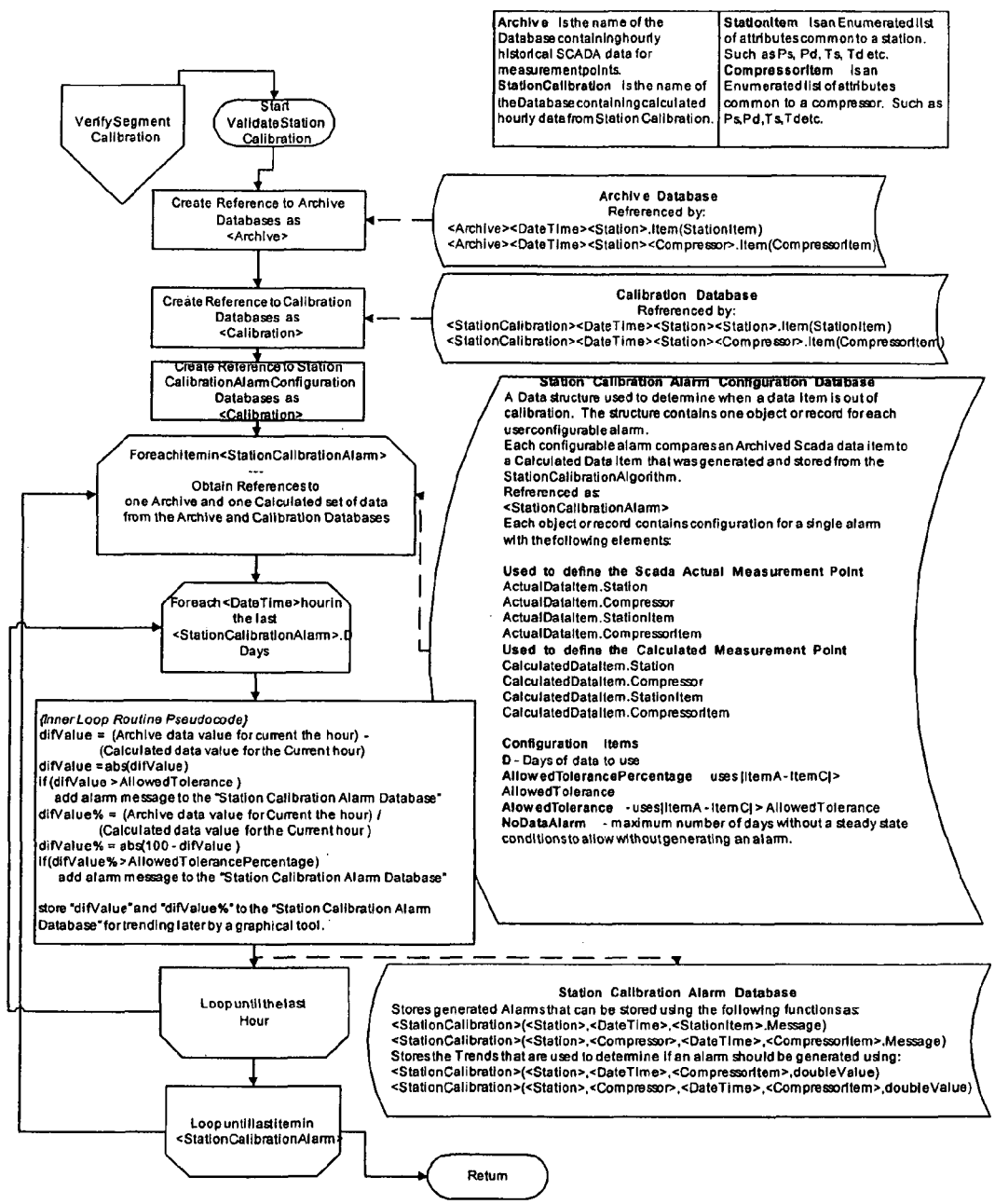
Figure 33:
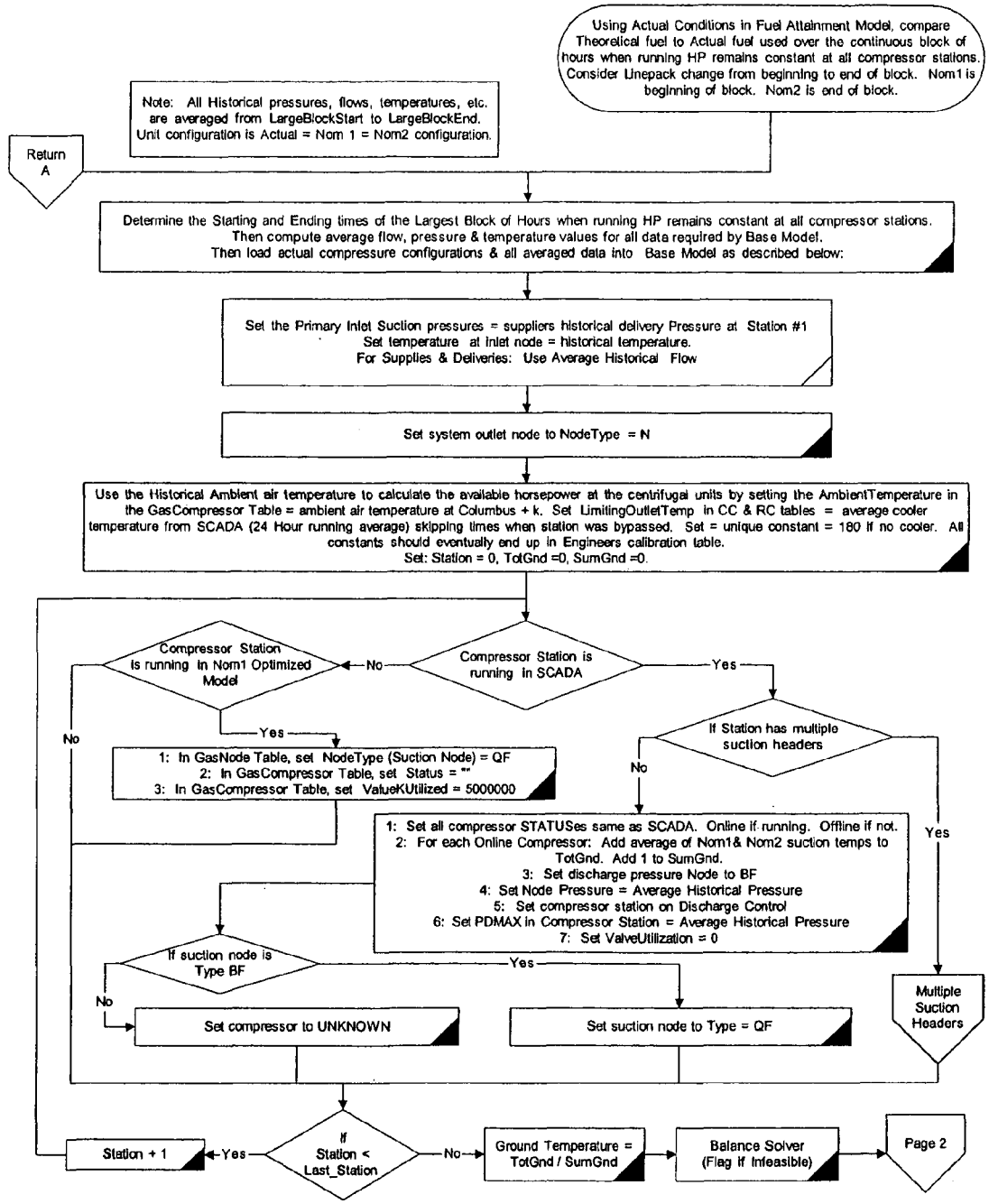
FIG. 33, FIG. 34, FIG. 35, and FIG. 36 are flow charts illustrating steps of a method for accurately measuring the fuel savings of the system according to an embodiment of the invention.
Figure 34:
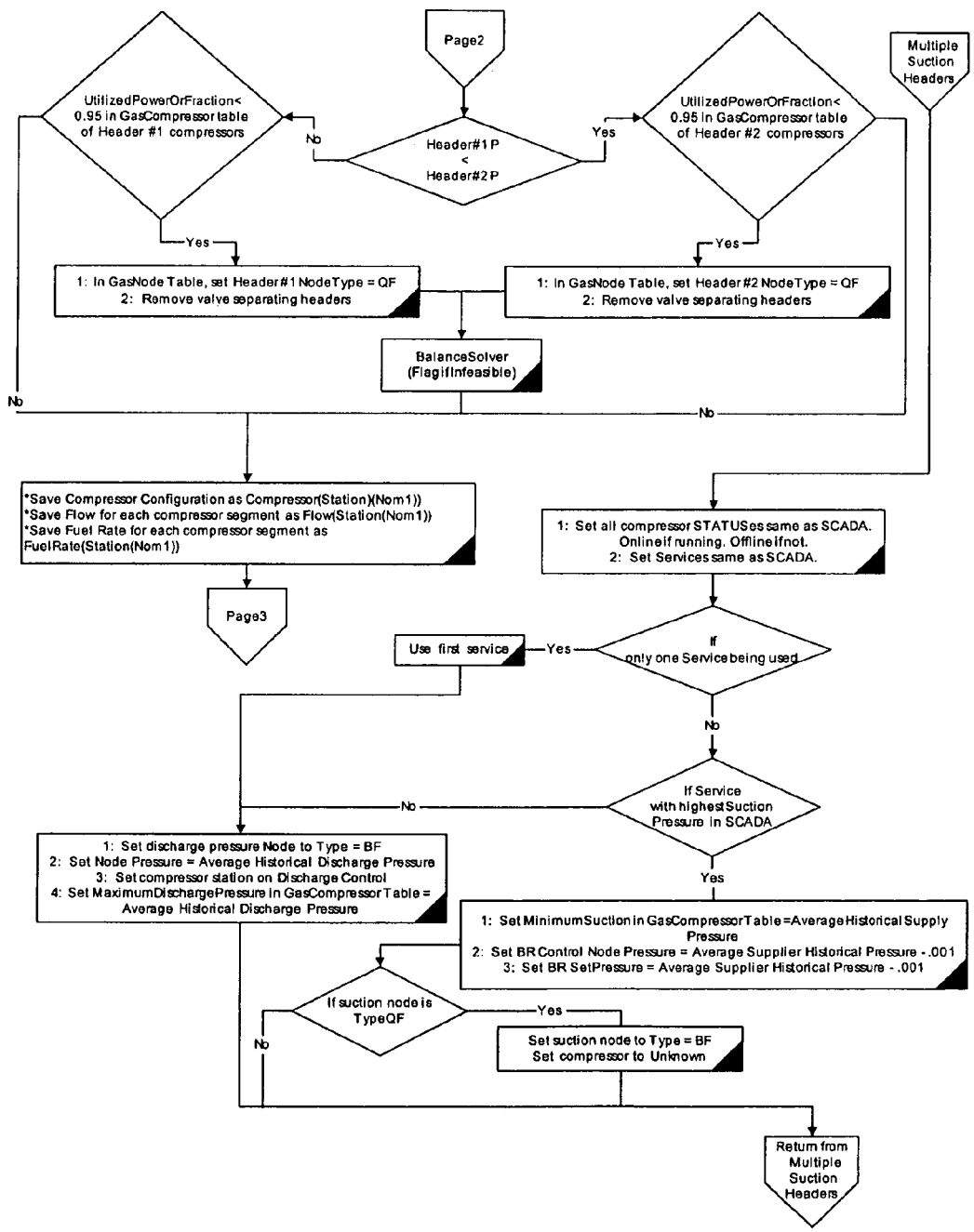
Figure 35:
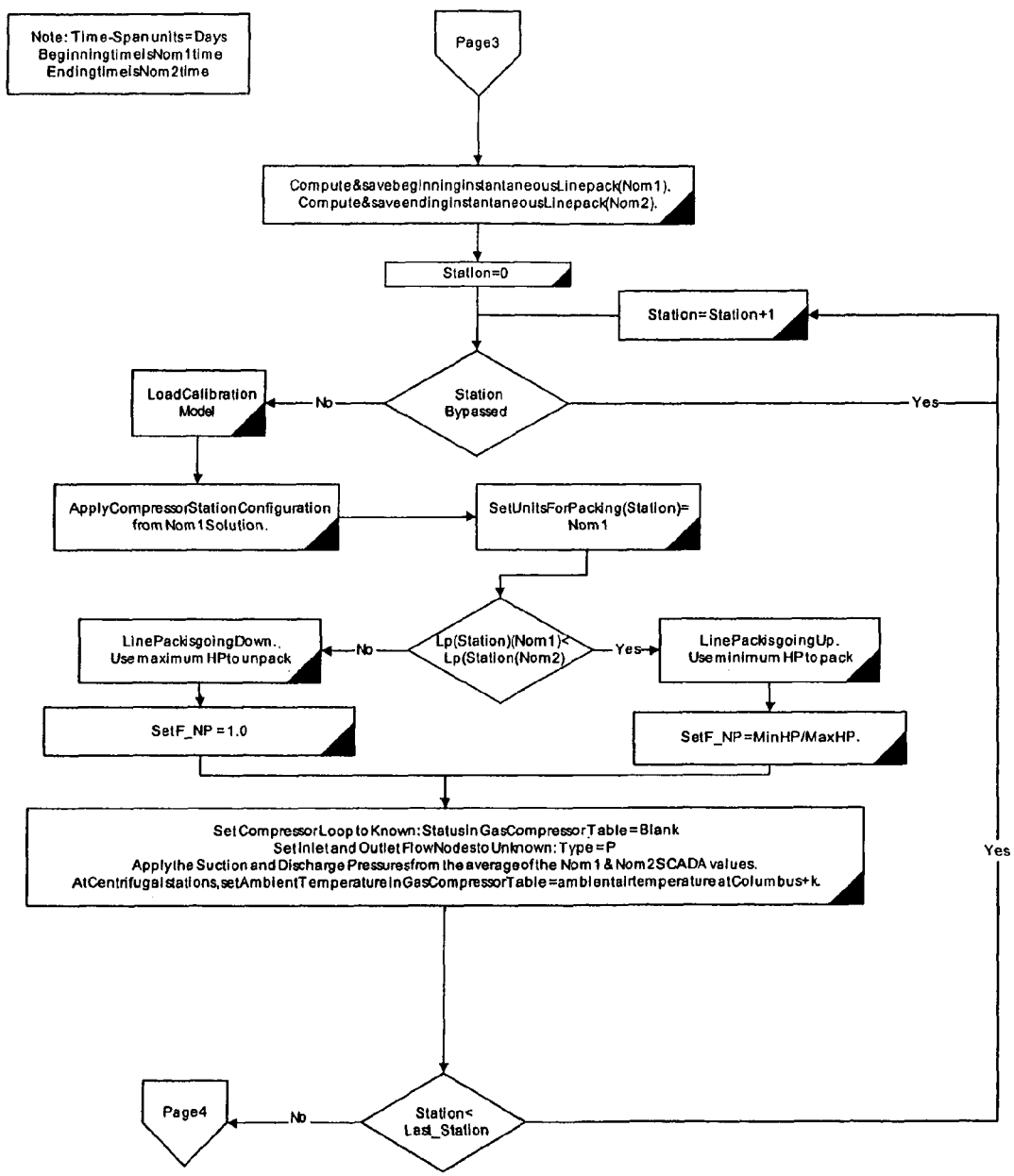
Figure 36:
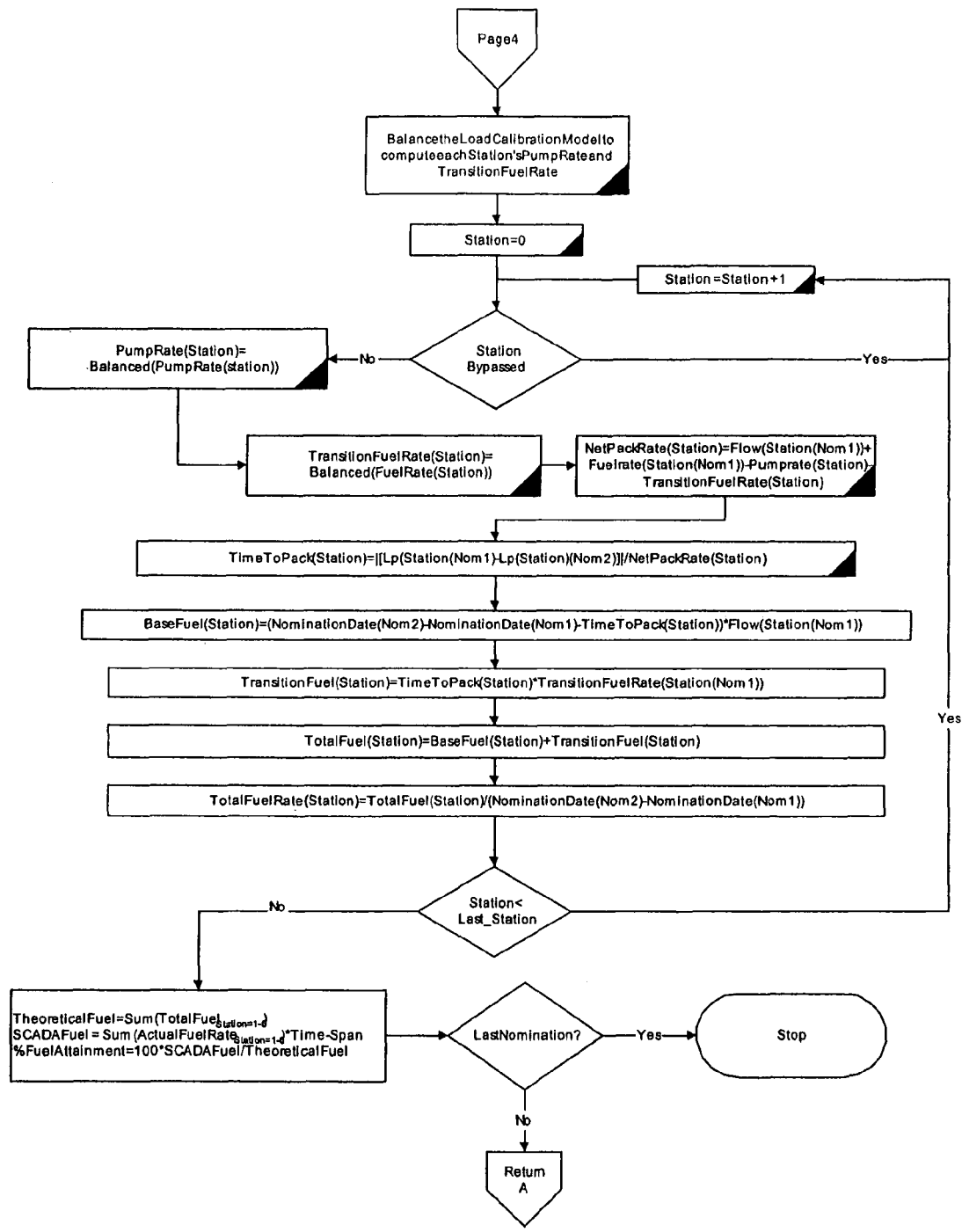

FIG. 26 shows general calibration processes that may be completed each day as a scheduled event or run on demand. FIG. 27, FIG. 28, FIG. 29, FIG. 30, FIG. 31, and FIG. 32 are schematic flow diagrams illustrating tasks involved in calibrating the system. Model, segment and station calibration processes store streams of calculated data that may be compared to actual measured data, thereby allowing a determination to be made whether a specific model is properly calibrated. When a section of calculated and actual data streams are within a defined tolerance, the model is within calibration limits for that particular time-period.

Model validation is the process of automatically comparing streams of actual measured data to streams of calculated data. This process uses predefined validation parameters for each stream pair to: (i) validate calculated data; (ii) create alarms for calculated data that is out of tolerance; and (iii) create a calculated-data archive that may be graphed later by the user.

Validation may be configured to allow any actual measured data stream to be compared to any calculated data stream using either an absolute or percentage tolerance.

Validation using absolute tolerance is successful when:

$$0 < \left( \sum_{n=First}^{n=Last} |Stream_A[n]_{Calculated} - Stream_B[n]_{Actual}| \right) / (Last - First) < Absolute\ Tolerance_j$$

Where Last is the most recent hour of the data stream to be validated and First is the oldest hour of the data stream to be validated.

Validation using percentage tolerance is successful when Percentage Tolerance Successful when:

$$0 < \left( \sum_{n=First}^{n=Last} |Stream_A[n]_{Actual} / Stream_B[n]_{Calculated}| \right) / (Last - First) < \%\ Tolerance_j$$

Where Last is the most recent hour of the data stream to be validated and First is the oldest hour of the data stream to be validated.

Tasks involved in the calibration include those shown in FIG. 27, FIG. 28, FIG. 29, FIG. 30, FIG. 31, and FIG. 32 and described above in the pseudocode. Data from each segment of the pipeline is examined, particularly those factors identified above in the pseudocode, and the models are corrected using the actual measured data from the pipeline.

The Automated Calibration Tool is not limited to fluid pipeline calibration. Rather, the calibration process may effectively used wherever models (steady-state or transient) are employed. Further, the Automated Calibration Tool may significantly reduce the effort required to calibrate a system. For example, the Automated Calibration Tool utilized nearly 300 model inputs. As a rough estimate, it may take approximately 1 hour per input to collect data and perform the necessary calculations. Hence, an engineer would take roughly 300 hours to tune the models once. However, the Automated Calibration Tool performs these calculations on a daily basis. This significantly reduces man hours required to calibrate models and helps ensure that the models are running safely and efficiently.

As noted above, pipeline flow optimization systems, software, and methods may emulate transient optimization by: (i) maintaining the optimal steady-state configurations and properly adjusting the optimal steady-state pressure targets through upset conditions employing "Black Box" logic; (ii) identifying through "Black Box" logic, existing field compressor logic, or supply or delivery change of the predictive models, when a new compressor configuration may be required; (iii) transitioning to the new optimal solution as quickly as possible; (iv) ensuring that the results are accurate through the verification process of the Automated Calibration Tool; and (v) quantifying the results of the pipeline optimization process through the Fuel Attainment process. Embodiments of the invention may provide for significant fuel reductions in compressor stations, thereby resulting in significant fuel savings while operating a pipeline.

Although the invention has been described with respect to certain embodiments, the embodiments described herein are intended to be exemplary, rather than limiting. Modifications and variations will occur to those of ordinary skill in the art, and may be made without departing from the scope of the invention, which is reflected in the following claims.

We claim:

1. A pipeline flow control optimization system comprising:
   a pipeline optimization module comprising at least one optimization model, wherein the pipeline optimization module is configured to produce a simulated optimum compressor configuration for a plurality of compressors on a pipeline;
   a multivariable controller configured to control the plurality of compressors on the pipeline based on the simulated optimum compressor configuration, the multivariable controller further configured to provide each controlled compressor with an optimal target setpoint;
   a monitor configured to monitor the pipeline, including the plurality of compressors on the pipeline, and to sense at least one upset condition; and
   an upset condition handler configured to react to at least one unset condition that was not simulated by the pipeline optimization module by
      calculating an adjustment factor for at least one of the plurality of compressors, wherein the adjustment factor is calculated to prevent the at least one compressor from exceeding an operating parameter,
      calculating an optimal adjusted setpoint by applying the adjustment factor to the optimal target setpoint for the at least one of the plurality of compressors, and
      providing the optimal adjusted setpoint to the multivariable controller, wherein the adjustment factor and optimal adjusted setpoint correct for the at least one upset condition that was not simulated by the pipeline optimization module.

2. The pipeline flow control optimization system of claim 1, further comprising:
   a linepack transition handler adapted to calculate and implement transitions in linepack in a pipeline system; and
   an administrative tool configured to monitor a performance of the pipeline system and to provide data to calibrate a model for steady-state and transient modeling of the pipeline system.

3. The pipeline flow control optimization system of claim 2, wherein the transitions in linepack are from a present optimal state to a future optimal state.

4. The pipeline flow control optimization system of claim 1, wherein the at least one upset condition comprises at least one condition selected from a group comprising:

an intake flow being less than a target intake flow, a discharge pressure being greater than a target discharge pressure, a discharge pressure approaching a maximum operating pressure, a speed driver of a compressor approaching 100% of maximum available power, a speed driver of a compressor approaching 0% of minimum available power, a cooler temperature approaching a maximum temperature, and a flow condition being greater or less than a contractual obligation at a particular discharge point.

5. The pipeline flow control optimization system of claim 2, wherein the administrative tool is configured to provide the data after sensing consecutive hours of static operating conditions within the pipeline system.

6. The pipeline flow control optimization system of claim 5, wherein the administrative tool is configured to provide the data after sensing six consecutive hours of static operating conditions.

7. The pipeline flow control optimization system of claim 2, wherein the administrative tool is further configured to monitor a performance of an individual line segment and an individual station and to provide data to calibrate a model for steady-state and transient modeling of the individual line segment and individual station.

8. The pipeline flow control optimization system of claim 7, wherein the administrative tool is further configured to monitor a performance of a coupled line segment and station and to provide data to calibrate a model for steady-state and transient modeling of the coupled line segment and station.

9. The pipeline flow control optimization system of claim 1, wherein the plurality of compressors comprises active compressors and inactive compressors; and the upset condition handler is further configured to operate the active compressors near maximum available power before activating additional compressors.

10. The pipeline flow control optimization system of claim 1, wherein the setpoint is at least one of a pressure setpoint, a horsepower setpoint, a speed driver setpoint, or a temperature setpoint.

11. A pipeline flow control optimization system comprising:

an optimizer configured to calculate a simulated optimum compressor configuration comprising a plurality of steady-state parameters for a plurality of components of a pipeline system and to provide the simulated optimum compressor configuration to an upset condition handler;

a multivariable controller configured to control the plurality of components of the pipeline system and to provide at least one pipeline system component with an optimal target setpoint; and a supervisory control and data acquisition system configured to acquire pipeline system data, wherein the upset condition handler is configured to receive the pipeline system data from the supervisory control and data acquisition system;

react to at least one upset condition that was not simulated by the optimizer by calculating an optimal adjusted setpoint for the at least one pipeline system component, wherein the optimal adjusted setpoint is calculated to be within the operating parameters of the at least one pipeline system component; and provide the multivariable controller with the optimal adjusted setpoint, wherein the optimal adjusted setpoint corrects for the at least one upset condition that was not simulated by the optimizer.

12. The pipeline flow control optimization system of claim 11, wherein the upset condition handler is included within the multivariable controller.

13. The pipeline flow control optimization system of claim 11, wherein the at least one upset condition comprises at least one condition selected from a group comprising:

an intake flow being less than a target intake flow, a discharge pressure being greater than a target discharge pressure, a discharge pressure approaching a maximum operating pressure, a speed driver of a compressor approaching 100% of maximum available power, a speed driver of a compressor approaching 0% of minimum available power, a cooler temperature approaching a maximum temperature, and a flow condition being greater or less than a contractual obligation at a particular discharge point.

14. The pipeline flow control optimization system of claim 11, wherein the upset condition handler is further configured to provide a warning to an operator in response to at least one upset condition.

15. The pipeline flow control optimization system of claim 11, further comprising an administrative tool configured to monitor a performance of the pipeline system and to provide data to calibrate a model for steady-state and transient modeling of the pipeline system.

16. The pipeline flow control optimization system of claim 11, further comprising a linepack transition handler configured to calculate and implement transitions in linepack in the pipeline system.

17. The pipeline flow control optimization system of claim 11, wherein the plurality of compressors comprises active compressors and inactive compressors; and the upset condition handler is further configured to operate the active compressors near maximum available power before activating additional compressors.

18. The pipeline flow control optimization system of claim 11, wherein the setpoint is at least one of a pressure setpoint, a horsepower setpoint, a speed driver setpoint, or a temperature setpoint.

19. A pipeline flow control optimization system comprising:

an optimizer configured to calculate a simulated optimum compressor configuration comprising a plurality of steady-state parameters for a pipeline system;

a control unit configured to control a plurality of pipeline system components that cause pipeline flow and to provide at least one pipeline system component with an optimal target setpoint;

a data acquirer configured to acquire pipeline system component data and pipeline flow data; and a control logic unit configured to analyze the pipeline system component data and the pipeline flow data provided by the data acquirer, detect at least one upset condition that was not simulated by the optimizer, calculate an adjustment factor for at least one pipeline system component, wherein the adjustment factor is calculated to prevent the at least one pipeline system component from exceeding an operating parameter, and adjust, without any input from a human operator, the optimal target setpoint of the at least one pipeline system component by applying the adjustment factor to the control unit, wherein the adjustment factor corrects for the at least one upset condition that was not simulated by the optimizer.

20. The pipeline flow control optimization system of claim 19, wherein the control logic unit comprises:
   an upset condition handler configured to analyze the pipeline system component data and the pipeline flow data; and
   a multivariable controller configured to control the plurality of pipeline system components that cause the pipeline flow.

21. The pipeline flow control optimization system of claim 20, wherein the control logic unit further comprises a linepack transition handler configured to calculate and implement transitions in linepack in the pipeline system.

22. The pipeline flow control optimization system of claim 19, further comprising an administrative tool configured to monitor a performance of the pipeline system and to provide data to calibrate a model for steady-state and transient modeling of the pipeline system.

23. The pipeline flow control optimization system of claim 19, wherein the at least one upset condition comprises at least one condition selected from a group comprising:
   an intake flow being less than a target intake flow,
   a discharge pressure being greater than a target discharge pressure,
   a discharge pressure approaching a maximum operating pressure,
   a speed driver of a compressor approaching 100% of maximum available power,
   a speed driver of a compressor approaching 0% of minimum available power,
   a cooler temperature approaching a maximum temperature, and
   a flow condition being greater or less than a contractual obligation at a particular discharge point.

24. The pipeline flow control optimization system of claim 19, wherein the control unit and the data acquirer are an integrated unit.

25. The pipeline flow control optimization system of claim 19, wherein
   the plurality of pipeline system components comprises active compressors and inactive compressors; and
   the control logic unit is further configured to operate the active compressors near maximum available power before activating additional compressors.

26. The pipeline flow control optimization system of claim 19, wherein the setpoint is at least one of a pressure setpoint, a horsepower setpoint, a speed driver setpoint, or a temperature setpoint.

27. A method of handling transient conditions in a pipeline flow control optimization system, the method comprising:
   calculating a simulated optimum compressor configuration for a plurality of compressors on a pipeline;
   controlling the plurality of compressors on the pipeline based on the simulated optimum compressor configuration;
   providing each controlled compressor with an optimal target setpoint;
   calculating an adjustment factor for at least one of the plurality of controlled compressors, wherein the adjustment factor is calculated to prevent the at least one compressor from exceeding an operating parameter;
   choosing at least one adjustment factor to apply to the pipeline flow control optimization system; and
   applying the chosen at least one adjustment factor to the pipeline flow control optimization system by adjusting the optimal target setpoint for the at least one of the plurality of controlled compressors, wherein the chosen at least one adjustment factor corrects for at least one unset condition that was not simulated in the simulated optimum compressor configuration.

28. The method of claim 27, wherein applying the chosen at least one adjustment factor comprises automatically adjusting control parameters of the pipeline flow optimization system.

29. The method of claim 27, wherein applying the chosen at least one adjustment factor comprises notifying a human operator.

30. The method of claim 27, further comprising:
   determining whether to adjust a target prior to calculating the adjustment factor; and
   initializing a data array.

31. The method of claim 30, further comprising storing the adjustment factor, wherein storing one or more adjustment factors comprises storing adjustment factors in the data array.

32. The method of claim 27, further comprising:
   operating an active compressor near maximum available power before activating an additional compressor.

33. The method of claim 27, wherein the setpoint is at least one of a pressure setpoint, a horsepower setpoint, a speed driver setpoint, or a temperature setpoint.

* * * * *